United States Patent
Cavender-Bares et al.

(10) Patent No.: US 10,123,473 B2
(45) Date of Patent: *Nov. 13, 2018

(54) ROBOTIC PLATFORM AND METHOD FOR PERFORMING MULTIPLE FUNCTIONS IN AGRICULTURAL SYSTEMS

(71) Applicant: RowBot Systems LLC, Minneapolis, MN (US)

(72) Inventors: Kent Cavender-Bares, St. Paul, MN (US); Charles C. Bares, Ellicottville, NY (US)

(73) Assignee: RowBot Systems LLC, Minneapolis, MN (US)

( * ) Notice: Subject to any disclaimer, the term of this patent is extended or adjusted under 35 U.S.C. 154(b) by 210 days.

This patent is subject to a terminal disclaimer.

(21) Appl. No.: 15/047,076

(22) Filed: Feb. 18, 2016

(65) Prior Publication Data
US 2016/0157415 A1    Jun. 9, 2016

Related U.S. Application Data

(63) Continuation of application No. 13/837,786, filed on Mar. 15, 2013, now Pat. No. 9,288,938.
(Continued)

(51) Int. Cl.
*A01C 7/00* (2006.01)
*A01B 69/04* (2006.01)
(Continued)

(52) U.S. Cl.
CPC ............ *A01B 69/008* (2013.01); *A01B 19/00* (2013.01); *A01B 51/02* (2013.01); *A01C 7/06* (2013.01);
(Continued)

(58) Field of Classification Search
USPC ...................................... 701/50, 23
See application file for complete search history.

(56) References Cited

U.S. PATENT DOCUMENTS 2,992,090 A    7/1961   Littler
3,608,827 A    9/1971   Kinkead
(Continued)

FOREIGN PATENT DOCUMENTS

EP    2267567    12/2010
EP    2286653    2/2011
(Continued)

OTHER PUBLICATIONS

European Communication dated Jan. 12, 2016 enclosing Extended European Search Report for EP Application No. 13797532.2.
(Continued)

*Primary Examiner* — Genna M Mott
(74) *Attorney, Agent, or Firm* — Patterson Thuente Pedersen, P.A.

(57) ABSTRACT

An autonomous vehicle platform system and method configured to perform various in-season management tasks, including selectively applying fertilizer, mapping growth zones and seeding cover crop within an agricultural field, while self-navigating between rows of planted crops and beneath the canopy of the planted crops on the uneven terrain of an agricultural field, allowing for an ideal in-season application of fertilizer to occur once the planted crop is well established and growing rapidly, in an effort to limit the loss of fertilizer.

15 Claims, 13 Drawing Sheets

Related U.S. Application Data

(60) Provisional application No. 61/654,444, filed on Jun. 1, 2012, provisional application No. 61/723,887, filed on Nov. 8, 2012, provisional application No. 61/739,268, filed on Dec. 19, 2012.

(51) Int. Cl.

| | | |
|---|---|---|
| *A01C 21/00* | (2006.01) | |
| *A01C 23/02* | (2006.01) | |
| *A01B 19/00* | (2006.01) | |
| *A01C 23/04* | (2006.01) | |
| *G05D 1/00* | (2006.01) | |
| *A01B 51/02* | (2006.01) | |
| *A01C 7/06* | (2006.01) | |

(52) U.S. Cl.
CPC .......... *A01C 21/002* (2013.01); *A01C 21/005* (2013.01); *A01C 21/007* (2013.01); *A01C 23/023* (2013.01); *A01C 23/024* (2013.01); *A01C 23/042* (2013.01); *A01C 23/047* (2013.01); *G05D 1/0088* (2013.01); *Y02P 60/214* (2015.11); *Y02P 60/215* (2015.11)

(56) References Cited

U.S. PATENT DOCUMENTS

| | | |
|---|---|---|
| 3,945,332 A | 3/1976 | Wirsbinski |
| 3,970,012 A | 7/1976 | Jones, Sr. |
| 4,015,366 A | 4/1977 | Hall, III |
| 4,197,690 A | 4/1980 | Eistert |
| 4,482,960 A | 11/1984 | Pryor |
| 4,525,988 A | 7/1985 | Harlan |
| 4,612,996 A | 9/1986 | Wolf et al. |
| 4,614,160 A | 9/1986 | Curlett |
| 4,628,633 A | 12/1986 | Nilsson |
| 4,630,773 A | 12/1986 | Ortlip |
| 4,637,328 A | 1/1987 | Topham et al. |
| 4,769,700 A | 9/1988 | Pryor |
| 4,919,060 A | 4/1990 | Cady |
| 4,967,362 A | 10/1990 | Schutten et al. |
| 5,033,397 A | 7/1991 | Colburn, Jr. |
| RE34,080 E | 9/1992 | Schmidt |
| 5,185,990 A | 2/1993 | Barnes et al. |
| 5,220,876 A | 6/1993 | Monson et al. |
| 5,353,724 A | 10/1994 | Wheeley, Jr. |
| 5,397,056 A | 3/1995 | Sakatani et al. |
| 5,410,479 A | 4/1995 | Coker |
| 5,442,552 A | 8/1995 | Slaughter et al. |
| 5,467,271 A | 11/1995 | Abel et al. |
| 5,520,125 A | 5/1996 | Thompson et al. |
| 5,651,500 A | 7/1997 | Patterson et al. |
| 5,661,817 A | 8/1997 | Hatelstad et al. |
| 5,668,719 A | 9/1997 | Bobrov et al. |
| 5,751,137 A | 5/1998 | Durrstein |
| 5,884,224 A | 3/1999 | McNabb |
| 5,923,270 A | 7/1999 | Sampo et al. |
| 5,974,348 A | 10/1999 | Rocks |
| 5,995,895 A | 11/1999 | Watt et al. |
| 6,129,226 A | 10/2000 | Donovan |
| 6,141,614 A | 10/2000 | Janzen et al. |
| 6,148,255 A | 11/2000 | Van Der Lely |
| 6,199,000 B1 | 3/2001 | Keller et al. |
| 6,236,907 B1 | 5/2001 | Hauwiller et al. |
| 6,266,595 B1 | 7/2001 | Greatline et al. |
| 6,278,918 B1 | 8/2001 | Dickson et al. |
| 6,336,051 B1 | 1/2002 | Pangels et al. |
| 6,349,775 B1 | 2/2002 | Lely et al. |
| 6,393,927 B1 | 5/2002 | Biggs et al. |
| 6,505,146 B1 | 1/2003 | Blackmer |
| 6,516,271 B2 | 2/2003 | Upadhyaya et al. |
| 6,553,299 B1 | 4/2003 | Keller et al. |
| 6,553,312 B2 | 4/2003 | Upadhyaya et al. |
| D476,340 S | 6/2003 | Niebuhr et al. |
| 6,671,582 B1 | 12/2003 | Hanley |
| 6,686,951 B1 | 2/2004 | Dickson et al. |
| 6,703,973 B1 | 3/2004 | Nichols |
| D488,487 S | 4/2004 | Isayama et al. |
| 6,745,128 B2 | 6/2004 | Hanson |
| 6,750,898 B1 | 6/2004 | Ishida et al. |
| 6,762,714 B2 | 7/2004 | Cohen et al. |
| 6,792,882 B2 | 9/2004 | Aspelin et al. |
| 6,889,620 B2 | 5/2005 | Fraisse et al. |
| 6,915,197 B2 | 7/2005 | Lely |
| 6,990,549 B2 | 1/2006 | Schneider |
| 7,103,451 B2 | 9/2006 | Seal et al. |
| 7,171,912 B2 | 2/2007 | Fraisse et al. |
| 7,184,859 B2 | 2/2007 | Hood et al. |
| 7,188,029 B1 | 3/2007 | Biddick |
| 7,248,968 B2 | 7/2007 | Reid |
| 7,343,867 B2 | 3/2008 | Fraisse et al. |
| 7,363,154 B2 | 4/2008 | Lindores |
| 7,421,338 B2 | 9/2008 | Kim et al. |
| 7,597,055 B2 | 10/2009 | Choulet |
| 7,669,675 B2 | 3/2010 | Hagie |
| 7,723,660 B2 | 5/2010 | Holland |
| 7,725,233 B2 | 5/2010 | Hendrickson et al. |
| 7,735,346 B2 | 6/2010 | Modaresi |
| 7,765,780 B2 | 8/2010 | Koselka et al. |
| 7,792,622 B2 | 9/2010 | Wei et al. |
| 7,857,237 B2 | 12/2010 | Vickers et al. |
| 7,898,470 B2 | 3/2011 | Heraud et al. |
| 7,957,850 B2 | 6/2011 | Anderson |
| 8,028,470 B2 | 10/2011 | Anderson |
| 8,121,345 B2 | 2/2012 | Jochem et al. |
| 8,150,554 B2 | 4/2012 | Anderson |
| 8,150,574 B2 | 4/2012 | Han et al. |
| 8,180,514 B2 | 5/2012 | Kaprielian et al. |
| 8,186,449 B2 | 5/2012 | Hackert et al. |
| 8,208,680 B2 | 6/2012 | Scharf et al. |
| 8,234,010 B2 | 7/2012 | Thompson et al. |
| 8,683,742 B1 | 4/2014 | Cox |
| 8,712,144 B2 | 4/2014 | Mas et al. |
| 8,744,626 B2 | 6/2014 | Johnson et al. |
| 8,755,976 B2 | 6/2014 | Peters et al. |
| 8,763,713 B2 | 7/2014 | Bassett |
| 8,849,523 B1 | 9/2014 | Chan et al. |
| 9,265,187 B2 | 2/2016 | Cavender-Bares et al. |
| 9,288,938 B2 | 3/2016 | Cavender-Bares et al. |
| 9,389,298 B2 | 7/2016 | Smitherman |
| 9,392,743 B2 | 7/2016 | Camacho-Cook et al. |
| 9,582,002 B2 | 2/2017 | Cavender-Bares |
| 2003/0229435 A1 | 12/2003 | Van der Lely |
| 2005/0055147 A1 | 3/2005 | Hrazdera et al. |
| 2005/0126144 A1 | 6/2005 | Koselka et al. |
| 2006/0014489 A1 | 1/2006 | Fitzner et al. |
| 2008/0027599 A1 | 1/2008 | Logan et al. |
| 2008/0046130 A1 | 2/2008 | Faivre et al. |
| 2009/0157259 A1 | 6/2009 | Han et al. |
| 2010/0250199 A1 | 9/2010 | Breedlove |
| 2011/0017111 A1 | 1/2011 | Paton et al. |
| 2011/0084851 A1 | 4/2011 | Peterson et al. |
| 2012/0101861 A1 | 4/2012 | Lindores |
| 2012/0143429 A1 | 6/2012 | Anderson |
| 2012/0195496 A1 | 8/2012 | Zaman et al. |
| 2013/0289817 A1 | 10/2013 | Kellum |
| 2013/0325242 A1 | 12/2013 | Cavender-Bares et al. |
| 2014/0012732 A1 | 1/2014 | Lindores |
| 2014/0379228 A1 | 12/2014 | Batcheller et al. |
| 2015/0051779 A1 | 2/2015 | Camacho-Cook et al. |
| 2016/0018224 A1 | 1/2016 | Isler et al. |

FOREIGN PATENT DOCUMENTS

| | | |
|---|---|---|
| EP | 2319285 | 5/2011 |
| EP | 2659759 | 11/2013 |
| ES | 2155800 | 5/2001 |
| ES | 2329107 | 11/2009 |
| FR | 2727276 | 5/1996 |
| JP | 2004008186 | 1/2004 |

(56) References Cited

FOREIGN PATENT DOCUMENTS

| JP | 2010161980 | 7/2010 |
|---|---|---|
| WO | WO2009141465 | 11/2009 |

OTHER PUBLICATIONS

International Search Report and Written Opinion for International Application No. PCT/US2014/05113 dated Nov. 26, 2014.
Application and File History for U.S. Appl. No. 13/837,786 dated Mar. 15, 2013, inventors Cavender-Bares et al.
Application and File History for U.S. Appl. No. 14/459,970, filed Aug. 14, 2014, inventors Camacho-Cook et al.
Application and File History for U.S. Appl. No. 14/548,421, filed Nov. 20, 2014, inventors Cavender-Bares et al.
Application and File History for U.S. Appl. No. 14/944,485, filed Jan. 13, 2016, inventor Cavender-Bares.
European Exam Report for European Application No. 13797532.2 dated Oct. 18, 2016.
10 Radically Innovative College Programs. Oct. 1, 2009, *Popular Mechanics*. Accessed Jan. 6, 2015 http://www.popularmechanics.com/science/3491456?src=soc_fcbk.
Alan Hagie | LinkedIn. 2012. Accessed Jan. 6, 2015 http://www.linkedin.com/pub/alan-hagie/10/838/b54.
An/(deere$) and Robot$ in AppFT Database. 2012, Accessed Jan. 6, 2015.
An/(deere$) and Robot$ in US Patent Collection, 2012, Accessed Jan. 6, 2015.
ANTS are the Tractor of the Future. 2011. *WIRED*. Accessed Jan. 6, 2015 http://www.wired.com/autopia/2011/02/ants-are-the-tractor-of-the-future/?utm_source=Contextly&utm_medium=RelatedLinks&utm_campaign=Previous.
Application of High Resolution Images from Unmanned Aerial Vehicles for Hydrology and Range Science. 2012. Accessed Jan. 6, 2015 http://www.spcru.ars.usda.gov/research/publications/publications.htm?seq_no_115=286359.
Armadillo Scout Arrived at Hohenheim: Mess- Und Prüftechnik. 2012, Accessed Jan. 6, 2015. https://mpt.uni-hohenheim.de/en/news/armadillo-angekommen-in-hohenheim-universitaet.
Arthur F. Lange—Google Search. Accessed Jan. 6, 2015, https://www.google.com/search?tbo=p&tbm=pts&hl=en&q=ininventor:%22Arthur+F.+Lange%22 #q=ininventor:%22Arthur+F.+Lange%22&hl=en&tbm=pts&ei=qcn1T4HjNPPE2QXvkNXvBg&start=0&sa=N&bav=on.2,or.r_gc.r_pw.r_qf.,cf.osb&fp=8221066f0ffb4009&biw=1308& bih=680.
Autonomous Soltuons, Inc. | Vehicle Automation | Robotic Software | Multi-vehicle Command and Control, Accessed Jan. 7, 2015, www.asirobots.com.
Autonomous Tractor is Outstanding in Its Field. 2011, *WIRED*, Accessed Jan. 6, 2015. http://www.wired.com/autopia/2011/09/autonomous-tractor-is-outstanding-in-its-field/.
Blue River Technology—Home, Accessed Jan. 6, 2015, http://bluerivert.com/.
Brown, Mark. Sep. 20, 2011. "Autonomous Self-sterring Tractor Gets About with GPS (Wired UK)." http://www.wired.co.uk/news/archive/2011-09/20/robotic-tractor.
Bryan Aivazian | LinkedIn. Accessed Jan. 6, 2015 http://www.linkedin.com/pub/bryan-aivazian/19/168/9b2.
Waugh, But Where's the Farmer: Robot Tractor Can Plant and Harvest All on Its Own—Even at Night | Mail Online, Sep. 26, 2011 http://www.dailymail.co.uk/sciencetech/article-2041999/But-wheres-farmer-Robot-tractor-plant-harvest--night.html.
Class Schedule for Class 342 Communications: Directive Radio Wave Systems and Device (E.G., Radar, Radio Navigation). Accessed Jan. 6, 2015.
Could Robot Tractors Revolutionize Agriculture? Sep. 20, 2011 http://www.world-science.net/othernews/110920_tractr Courtesy of Catholic University of Leuven and World Science Staff.
Distributed Robotic Guidance. Keegan et at.

Tonneson, Driverless Tractor May Debut in Valley—Farm Progress. May 1, 2012 http://farmprogress.com/blogs-driverless-tractor-may-debut-valley-3213.
Field Robot Website [fieldrobot.dk]. Accessed Jan. 6, 2015 http://www.fieldrobot.dk/pages/armadillo.php now www.frobomind.org.
Full Title for Class 180 Subclass 401.Accessed Jan. 6, 2015.
Full Title for Class 340 Subclass 990. Accessed Jan. 6, 2015.
Full Title for Class 340 Sublass 995.12. Accessed Jan. 6, 2015.
Full Title for Class 700 Subclass 207. Accessed Jan. 6, 2015.
GreenSeeker Chlorophyll Sensors Perform Variable Rate Fertilizing of Wheat and Corn Crops. Accessed Jan. 6, 2015. http://www.ntechindustires.com/greenseeker-home.html.
Hagie Manufacturing Company—Leader in High Clearance, Self-Propelled Agricultural Sprayers. Accessed Jan. 6, 2015 http://www.hagie.com/.
Harvest Automation—Tough, Smart Simple Robots. Accessed Jan. 6, 2015 http://www.harvestai.com/.
Illinois Agronomy Handbook. Accessed Jan. 6, 2015. http://extension.cropsci.illinois.edu/handbook/.
Illinois Agronomy Handbook, 1999-2000. http://www.archive.org/stream/illinoisagronomy1360univ#page/96/mode/2up.
Innovation in Planters and Grain Carts : Kinze Manufacturing. Accessed Jan. 6, 2015. http://www.kinze.com/.
IRobot Corporation: Robots That Make a Difference. Accessed Jan. 6, 2015. http://www.irobot.com/us/.
Jensen, ISPA | A Low Cost, Modular Robotics Tool Carrier for Precision Agriculture Research Jul. 20-23, 2014 http://www.ispag.org/presentation/1/1221/.
Jaybridge Robotics. Accessed Jan. 6, 2015 http://www.jaybridge.com/.
John Deere AutoTrac RowSense Guidance Systems Agricultural Management Solutions (AMS). Accessed Jan. 7, 2015 http://www.deere.com/wps/dcom/en_INT/products/equipment/agricultural_management_solutions/guidance_systems/autotrac_rowsense/autotrac_rowsense.page.
John Deere Products & Services. Accessed Jan. 5, 2015. http://www.deere.com/en_US/regional_home.page.
John Deere Tango E5 Autonomous Mower. Accessed Jan. 6, 2015 http://www.deere.com/wps/dcom/en_INT/products/equipment/autonomous_mower/tango_e5/tango_e5.page.
Jorge Heraud | LinkedIn. Accessed Jan. 6, 2015 http://www.linkedin.com/pub/jorge-heraud/5/b94/704.
Lamm, F.R., and A.J. Schlegel. 2000. "Nitrogen Fertigation for Corn Using SDI : A BMP." Nitrogen Fertilization for corn production when using LEPA center Pivot Sprinkler. Accessed Jan. 7, 2015 http://www.ksre.ksu.edu/pr_irrigate/Reports/LF61900V.htm.
Lee Redden | LinkedIn. Accessed Jan. 6, 2015 http://www.linkedin.com/pub/lee-redden/25/225/925.
Media, mumbo jumbo. "BoniRob field robot measures maize plants." Accessed Jan. 7, 2015. http://go awayamazone.de/index.php?lang=1&news=26.
Miller Self Propelled Sprayers—Home. Accessed Jan. 6, 2015 http://www.millerstn.com/.
New John Deere Strategy Takes Intelligent Farming to the Next Level. Nov. 13, 2011. http://www.deere.com/wps/dcom/en_INT/our_company/news_and_media/press_releases/2011/nov/farm_sight.page.
Kinze Manufacturing Unveils First Autonomous Row Crop Technology. Kinze Manufacturing. Jul. 29, 2011. Williamsburg, IA.
Autoprobe. Accessed Jan. 7, 2015. www.argobotics.com.
Maruyama Mfg. Co., Inc. Homepage Accessed on Jan. 7, 2015 http://www.maruyama.co.jp/english/index.html.
Noel Wayne Anderson—Google Search. Accessed Jan. 6, 2015 https://www.google.com/search?tbo=p&tbm=pts&hl=en&q=ininventor:%22Noel+Wayne+Anderson%22.
Pocock, John. Jan. 1, 2006. "Robot Farming, Really?| Content from Corn and Soybean Digest." http://cornandsoybeandigest.com/robot-farming-really.
Deer and Company, Published May 1, 2012Powered Mobile Module and Attachment Combination. . http://www.google.com/patents?id=_eQNAgAAEBAJ&printsec=frontcover&dq=8,167,053&hl=en&sa=X&ei=o8_gT8K5J4j68gSbndiVDQ&ved=0CDUQ6AEwAA.

(56) References Cited

OTHER PUBLICATIONS

Precision and Fertiliz$ and Farm$ and Robot$ Andnot Cancer Andnot Particl$ in US Patent Collection Accessed Jan. 6, 2015.
Roesler et al., Robot Tractor Will Make Debut in September in N.D., Mar. 5, 2012. *Tri State Neighbor.* Accessed Jul. 6, http://www.tristateneighbor.com/news/agri-tech/article_c61b01be-670f-11e1-a348-0019bb2963f4.html.
Rocona, Inc. 2012. Accessed Jan. 6, 2015, http://www.rocona.com/.
Self-steering Automated Tractor Offers More Precision in the Field—KU Leuven. 2011. http://www.kuleuven.be/english/news/tractor.
Sidedress in US Patent Collection. Accessed Jan. 6, 2015.
Sidedress$ in US Patent Collection. Accessed Jan. 7, 2015.
Solum, Inc. Accessed Jan. 6, 2015 http://solum.ag/.
Smalley, These May Be the Droids Farmers Are Looking For. Nov. 11, 2011 http://www.wired.com/business/2011/11/mobile-farm-robots/.
Trimble—Agriculture—Flow & Application Control—Planting. Accessed Jan. 7, 2015, www.trimble.com.
Ttl/(agricultur$ and Robot) or Abst/(agricultur$ and Robot) in US Patent Collection. Accessed Jan. 6, 2015.
Ttl/(farm$ and Robot$) or Abst/(farm$ and Robot$) in US Patent Collection. 2012. Accessed Jan. 6, 2015.
Ttl/(fertil$ and Corn) or Abst/(fertil$ and Corn) in US Patent Collection. Accessed Jan. 6, 2015.
Ttl/(fertil$ and Robot) or Abst/(fertil$ and Robot) in US Patents Text Collection. Accessed Jan. 6, 2015.
Ttl/(robot$ and Agricultur$) in US Patent Collection. 2012. Accessed Jun. 19.
Z,Class 056/10.2x—Harvesters (with Distance Measuring Means, Automated, Etc.). 2011 Accessed Jan. 6, 2015.
Z,Class 172/4.5—Earth Working, Land Leveller Type. Accessed Jan. 6, 2015.
Z,Class 180/401—Motor Vehicles. 2011. Accessed Jan. 6, 2015.
Z.Class 180/401—Motor Vehicles (sterring with Terrestrial Guide). 2011 Accessed Jan. 6, 2015.
Z.Class 239/728—Fluid Sprinkling, Spraying, and Diffusing (center Pivot). 2012. Accessed Jan. 6, 2015.
Z.Class 390/9906—Communications: Electrical (remote Vehicle Shown on Map) 2012 Accessed Jan. 6, 2015.
Z.Class 340/995.12—Communications: Electrical (transmission of Map Data to Vehicle) 2012 Accessed Jan. 6, 2015.
Z.Class 342/357.52, Etc. Accessed Jan. 6, 2015.
Z.Class 700/207—Data Processing: Generic Control Systems or Specific Applications. 2011 Accessed Jan. 6, 0215.
Z.Class 700/213—Data Processing: Generic Control Systems or Specific Applications. 2011 Accessed Jan. 6, 2015.
Z.Class 700/245—Data Processing: Generic Control Systems or Specific Applications. 2011 Accessed Jan. 6, 2015.
Z.Class 700/284—Data Processing: Generic Control Systems or Specific Applications. 2011 Accessed Jan. 6, 2015.
Z.Class 700/50—Data Processing: Generic Control Systems or Specific Applications. 2011 Accessed Jan. 6, 2015.
Z.Class 701/23—Data Processing: Vehicles, Navigation, and Relative Location. 2011 Accessed Jan. 6, 2015.
Z.Class 701/50—Data Processing: Vehicles, Navigation, and Relative Location. 2012, Accessed Jun. 14.
Robocrop Vision Guidance, http://thtechnology.co.ukk/Robocrop.html Aug. 10, 2013.
John Deere http://www.deere.com/en_IN/home_page/ag_home/products/technology/technology.html Dec. 6, 2013.
*Jaybridge Robotics: Kinze Autonomous Grain Cart Case Study,* 2011. http://www.youtube.com/watch?v=MhA5aIw7xNk&feature=youtube_gdata_player. Transcription.
*Jaybridge Robotics: Kinze Autonomous Grain Cart System Technical Tour.* 2011. http://www.youtube.com/watch?v=k0Lj_5MBu8w&feature=youtube_gdata_player. Transcription.
*Kinze Autonomy Project Unveiled,* 2011. http://www.youtube.com/watch?v=pocvkqlcyog&feature=youtube_gdata_player. Transcription.

Benson, Eric. *The Good, The Bad and The Ugly: Adcanced Technology in Agriculture,* Delaware Experimental Station, Department of Bioresources Engineering, College of Agriculture and Natural Resources, University of Delaware, Prior to Jan. 6, 2015.
Codo, Jean-Marie, M Poncelet, A Monin, and M Devy. 2011. *Safety Robotic Lawnmower with Precise and Low-cost L1-only RTK-GPS Positioning.*
D.W., Franzen, *Nitrogen Extenders and Additives.* NDSU Extension. Prior to Jan. 6, 2015.
Dinnes, D, D Jaynes, et al. *Plant-Soil-Microbe N Relationships in High Residue Management Systems.* USDA-ARS National Soil Tilth Laboratory. Prior to Jan. 6, 2015.
Ebelhar, SA. *Evaluation of New Nitrogen Fertilizer Technologies for Corn.* Prior to Jan. 6, 2015.
Mengel, David B. *Managing Nutrients in No-till: Surface Application of N and P,* Department of Agronomy Kansas State University. Prior to Jan. 6, 2015.
Rizos, Chris, and Shaowel Han. 1998. *Status and Trends for High Precision GPS Kinematic Positioning.*
Lohr, Steve. 2011. "Lean Start-Ups Reach Beyond Silicon Valley's Turf." *The New York Times,* Dec. 5, 2011 sec. Science. http://www.nytimes.com/2011/12/06/science/lean-start-ups-reach-beyond-silicon-valleys-turf.html.
Arvidsson et al., Rubber Track Systems for Conventional Tractor—Effects on soil compaction and traction. 2011. Soil & Tillage Research. Elsevier.
Åstrand et al., "An Agricultural Mobile Robot with Vision-Based Perception for Mechanical Weed Control", Autonomous Robots 13, 20-35 (2002). HamstadUniversity.
Baerveldt, "Guest Editorial: Agricultural Robotics", Automous Robots 13, 5-7 (2002). Hamstad University.
Baker et al., "A Point-Injector Applicator to Improve Fertilizer Management" 1989, Applied Engineering Agriculture pp. 334-338.
Bakhsh et al., "N-Applicastion Methods and Precipitation Pattern Effects on Subsurface Drainage Nitrate Losses and Crop Yields", Water Air Soil Pollut (2010) 212:65-76.
Bierman et al., "Survey of Nitrogen Fertilizer use on corn in Minnesota", Agricultural Systems 109 (2012) 43-52. Elsevier.
Bivin et al., "Mechanics of Dynamic Penetration into Soil Medium", Mechanics of Solids. Dec. 2010. vol. 45, Issue 6. Abstract.
Boguslavskii et al., "Theory and Practice of Projectile's Penetration in Soils", Journal of Geotechnical Engineering. Oct. 1996.
Bremner, "Recent research on problems in the use of urea as a nitrogen fertilizer", Fertilizer Research 42:231-329 (1995). Department of Agronomy.
Cariou et al., "Automatic Guidance of a Four-Wheel-Steering Mobile Robot", Journal of Field Robótics 26(6-7), 2009.
Cassel et al., "Tillage Effects on Corn Production and Soil Physical Conditions", Soil Science Society of America Journal. 59:1436-1443. (1995).
Cassman, Kenneth G., Achim Dobermann, and Daniel T. Walters. 2002. "Agroecosystems, Nitrogen-Use Efficiency, and Nitrogen Management." *Ambio* 31 (2) (Mar. 1): 132-140. doi:10.2307/4315226.
Chen, Guihua, and Ray R. Weil. 2011. "Root Growth and Yield of Maize as Affected by Soil Compaction and Cover Crops." *Soil and Tillage Research* 117 (0) (December): 17-27. doi: 10.1016/j.still.2011.08.001.
Cordill, C., and T.E. Grift. 2011, "Design and Testing of an Intra-row Mechanical Weeding Machine for Corn," *Biosystems Engineering* 110 (3) (November):247-252. doi:10.1016/j.biosystemseng.2011.07.007.
Davis, Adam S., Jason D. Hill, Craig A. Chase, Ann M. Johanns, and Matt Liebman. 2012. "Increasing Cropping System Diversity Balances Productivity, Profitability and Environmental Health," *PLoS ONE* 7 (10) (Oct. 10): e47149. doi:10.1371/journal.pone,0047149.
Dawar, K., M. Zaman, J.S. Rowarth, J. Blennerhassett, and M.H. Turnbull. 2011. "Urease Inhibitor Reduces N Losses and Improves Plant-bioavailability of Urea Applied in Fine Particle and Granular Forms Under Field Conditions." *Agriculture, Ecosystems & Environment* 144 (1) (November): 41-50. doi:10.1016/j.agee.2011.08.007.

(56) References Cited

OTHER PUBLICATIONS

Dong, Fuhong, Wolfgang Heinemann, and Roland Kasper. 2011. "Development of a Row Guidance System for an Autonomous Robot for White Asparagus Harvesting." *Computers and Electronics in Agriculture* 79 (2) (November): 216-225. doi:10.1016/j.compag.2011.10.002.
Donovan, G.T. 2012. "Position Error Correction for an Autonomous Underwater Vehicle Inertial Navigation System (INS) Using a Particle Filter." *IEEE Journal of Oceanic Engineering* 37 (3) (July): 431-445. doi:10.1109/JOE.2012.2190810.
Doran, John W. 1980. "Soil Microbial and Biochemical Changes Associated with Reduced Tillage." *Soil Science Society of America Journal* 44 (4): 765-771. doi:10.2136/sssaj1980.03615995004400040022x.
Engel, R., C. Jones, and R. Wallander. 2011. "Ammonia Volatilization from Urea and Mitigation by NBPT Following Surface Application to Cold Soils." *Soil Science Society of American Journal* 75 (6): 2348. doi:10.2136/sssaj2011.0229.
Van Es, H.M., C.P. Gomes, M. Sellmann, and C.L. van Es. 2007, "Spatially-Balanced Complete Block Designs for Field Experiments." *Geoderma* 140 (4) (Aug. 15):346-352. doi:10.1016/j.geoderma.2007.04.017.
Es, Van, H. M, Van Es, and C. L. 1993. "Spatial Nature of Randomization and Its Effect on the Putcome of Field Experiments." *Agronomy Journal* 85 (2): 420-428. doi: 10.2134/agronj1993.00021962008500020046x.
Fox, R. H., J. M. Kern, and W. P. Piekielek. 1986. "Nitrogen Fertilizer Source, and Method and Time of Application Effects on No-till Corn Yields and Nitrogen Uptakes." *Agronomy Journal* 78 (4): 741-746. doi: 10.2134/agronj11986.00021962007800040036x.
Gagnon, Bernard, and Noura Ziadi, 2010. "Grain Corn and Soil Nitrogen Responses to Sidedress Nitrogen Sources and Applications." *Agronomy Journal* 102 (3): 1014. doi:10.2134/agronj2010.0011.
Gagnon, Bernard, Noura Ziadi, and Cynthia Grant, 2012. "Urea Fertilizer Forms Affect Grain Corn Yield and Nitrogen Use Efficiency." *Canadian Journal of Soil Science* 92 (2) (February): 341-351. doi:10.4141/cjss2011-074.
Gavric, M., M. Martinov, S. Bojic, Dj. Djatkov, and M. Pavlovic. 2011. "Short- and Long-term Dynamic Accuracies Determination of Satellite-based Positioning Devices Using a Specially Designed Testing Facility." *Computers and Electronics in Agriculture* 76 (2) (May): 297-305. doi:10.1016/j.compag.2011.02.008.
Gee, Christelle. 2008, "Detecting Crops and Weeds in Precision Agriculture." *SPIE Newsroom*. doi:10.1117/2.1200809.1226. http://spie.org.X27354.xml.
Halvorson, Ardell D., and Stephen J. Del Grosso. 2012. "Nitrogen Source and Placement Effects on Soil Nitrous Oxide Emissions from No-Till Corn." *Journal of Environment Quality* 41 (5): 1349, doi:10.2134/jeq2012.0129.
Harrigan, Tim, S Snapp, R Leep, D Mutch, and N Rector. 2007. "Manure Slurry-Enriched Seeding of Cover Crops." *Resource* (February).
Hendrickson, L.L., and E.A. Douglas. 1993. "Metabolism of the Urease Inhibitor N-(n-butyl)thiophosphoric Triamide (nbpt) in Soils." *Soils Biology and Biochemistry* 25 (11) (November): 1613-1618. doi:10.1016/0038-0717(93)90017-6.
Hernandez-Ramirez, Guillermo, Sylvie M. Brouder, Douglas R. Smith, and George E. Van Scoyoc, 2011. "Nitrogen Partitioning and Utilization in Corn Cropping Systems: Rotation, N Source, and N Timing." *European Journal of Agronomy* 34 (3) (April): 190-195. doi:10.1016/j.eja.2010.12.002.
Herrick, J.E. 2005. "Response to 'Comments on "Simultaneous Measurement of Soil Penetration Resistance and Water Content with a Combined Penetrometer-TDR Moisture Probe" and "A Dynamic Cone Penetrometer for Measuring Soil Penetration Resistance.""" *Soil Science Society of American Journal* 69 (3): 926. doi:10.2136/sssaj2005.0926.

Herrick, Jeffrey E., and Tim L. Jones. 2002. "A Dynamic Cone Penetrometer for Measuring Soil Penetration Resistance." *Soil Science Society of American Journal* 66 (4): 1320. doi:10.2136/sssaj2002.1320.
Howard, Donald D., and Michael E. Essington. 1998. "Effects of Surface-Applied Limestone on the Efficiency of Urea-Containing Nitrogen Sources for No-Till Corn." *Agronomy Journal* 90 (4): 523-528. doi:10.2134/agronj1998.00021962009000040014x.
Iida, Michihisa, Donghyeon Kang, Mitsuru Taniwaki, Mutsumi Tanaka, and Mikio Umeda. 2008. "Localization of $CO_2$ Source by a Hexapod Robot Equipped with an Anemoscope and a Gas Sensor." *Computers and Electronics in Agriculture* 63 (1) (August): 73-80. doi:10.1016/j.compag.2008.01.016.
Karlen, D.L., E.C. Berry, T.S. Colvin, and R. S. Kanwar. 1991, "Twelve year Tillage and Crop Rotation Effects on Yields and Soil Chemical Properties in Northeast Iowa 1." *Communications in Soil Science and Plant Analysis* 22 (19-20): 1985-2003. doi:10.1080/00103629109368552.
Kitur, B. K., M. S. Smith, R. L. Blevins, and W. W. Frye. 1984. "Fate of 15N-Depleted Ammonium Nitrate Applied to No-Tillage and Conventional Tillage Corn." *Agronomy Journal* 76 (2): 240-242. doi:10.2134/agronj1984.00021962007600020016x.
Kyveryga, P. M., and T. M. Blackmer. 2012a. "On-Farm Evaluations to Calibrate Tools for Estimating Late-Season Nitrogen Status of Corn," *Agronomy Journal* 104 (5): 1284. doi:10.2134/agronj2011.0403.
Lawes, R. A., and R. G. V. Bramley. 2012. "A Simple Method for the Analysis of On-Farm Strip Trails," *Agronomy Journal* 104 (2): 371. doi:10.2134/agronj2011.0155.
Lehrsch, Gary A., R. E. Sojka, and D. T. Westermann. 2000. "Nitrogen Placement, Row Spacing, and Furrow Irrigation Water Positioning Effects on Corn Yield." *Agronomy Journal* 92 (6) (Nov. 1): 1266-1275. doi:10.2134/agronj2000.9261266x.
Ma, B. L., M. Li, L. M. Dwyer, and G. Stewart. 2004. "Effect of In-season Application Methods of Fertilizer Nitrogen on Grain Yield and Nitrogen Use Efficiency in Maize." *Canadian Journal of Soil Science* 84 920 (May): 169-176. doi:10.4141/S03-052.
Ma, B. L., T. Y. Wu, N. Tremblay, W. Deen, N. B. McLaughlin, M. J. Morrison, and G. Stewart. 2010. "On-Farm Assessment of the Amount and Timing of Nitrogen Fertilizer on Ammonia Volatilization." *Abstract*.
Mengel, D. B., D. W. Nelson, and D. M. Huber. 1982. "Placement of Nitrogen Fertilizers for No-Till and Concentional Till Corn." *Agronomy Journal* 74 (3): 515-518. doi:10.2134/agronj1982.00021962007400030026x.
Miller, Kathleen W., Michael A. Cole, and Wayne L. Banwart. 1991, "Microbial Populations in an Agronomically Managed Mollisol Treated with Simulated Acid Rain." *Journal of Environmental Quality* 20 (4): 845-849. doi:10.2134/jeq1991.00472425002000040023x.
Minasny, Budiman, and Alex B. McBratney, 2005. "Comments on 'Simultaneous Measurement of Soil Penetration Resistance and Water Content with a Combined Penetrometer-TDR Moisture Probe' and 'A Dynamic Cone Penetrometer for Measuring Soil Penetration Resistance'." *Soil Science Society of America Journal* 69 (3): 925. doi:10.2136/sssaj2005.0925.
Moita, Raquel Durana, Henrique A. Matos, Cristina Fernandes, Clemente Pedro Nunes, and Mário Jorge Pinho. 2012. "Evaluation of the Performance of a Heated Brine Spray System by Dynamic Simulation." *Computers & Chemical Engineering* 41 (0) (Jun. 11): 106-122. doi:10.1016/j.compchemeng.2012.03.007.
Nelson, Kelly A., Peter C. Scharf, William E. Stevens, and Brice A. Burdick. 2011. "Rescue Nitrogen Applicatiions for Corn." *Soil Science Society of America Journal* 75 (1): 143. doi:10.2136/sssaj2009.0456.
Niemoeller, Bernd, H. H. Harms, and T. Lang. 2011. "Injection of Liquids into the Soil with a High-pressure Jet." *Agricultural Engineering International: CIGR Journal* 13 (2) (Aug. 18). http://www.cigrjournal.org/index.php/Ejounral/article/view/1458.
Nye, Peter H. 1992. "Toward the Quantitative Control of Crop Production and Quality. II. The Scientific Basis for Guiding Fertil-

(56) References Cited

OTHER PUBLICATIONS izer and Management Practice, Particularly in Poorer Countries." *Journal of Plant Nutrition* 15 (6-7): 1151-1173. doi:10.1080/01904169209364387.

Nyord, T., H.T. Søgaard, M.N. Hansen, and L.S. Jensen. 2008. "Injection Methods to Reduce Ammonia Emission from Volatile Liquid Fertilisers Applied to Growing Crops." *Biosystems Engineering* 100 (2) (June): 235-244. doi:10.1016/j.biosystemseng.2008.01.013.

Paulson, Nicholas D., and Bruce A. Babcock. 2010. "Readdressing the Fertilizer Problem," *Journal of Agricultural and Resource Economics* 35 (3) (December): 368-384.

Pedersen, S., S. Fountas, H. Have, and B. Blackmore. 2006. "Agricultural Robots—system Analysis and Economic Feasibility." *Precision Agriculture* 7 (4): 295-308. doi:10.1007/s11119-006-9014-9.

Perez-Ruiz, M., J. Carballido, J. Agueera, and J. A. Gil. 2011. "Assessing GNSS correction signals for assisted guidance systems in agricultural vehicles." *Precision Agriculture* 12 (5) (October). Abstract.

Pérez-Ruiz, M., D.C. Slaughter, C.J. Gliever, and S.K. Upadhyaya. 2012. "Automatic GPS-based Intra-row Weed Knife Control System for Transplanted Row Crops," *Computers and Electronics in Agriculture* 80 (0) (January): 41-49. doi:10.1016/j.compag.2011.10.006.

Randall, Gyles W., Jeffrey A. Vetsch, and Jerald R. Huffman. 2003. "Corn Production on a Sunsurface-Drained Mollisol as Affected by Time of Nitrogen Application and Nitrapyrin." *Agronomy Journal* 95 (5): 1213. doi:10.2134/agronj2003.1213.

Raun, William R., and Gordon V. Johnson. 1999, "Improving Nitrogen Use Efficiency for Cereal Production." *Agronomy Journal* 91 (3):357-363. doi:10.2134-argonj1999.00021962009100030001x.

Raun, WR, JB Solie, GV Johnson, ML Stone, RW Mullen, KW Freeman, WE Thomason, and EV Lukina. 2002. "Improving Nitrogen Use Efficiency in Cereal Grain Production with Optical Sensing and Variable Rate Application." *Agronomy Journal* 94 (4) (August): 815-820.

Ressler, Daniel E., Robert Horton, Thomas C. Kaspar, and James L. Baker. 1998. "Localized Soil Management in Fertilizer Injection Zone to Reduce Nitrate Leaching." *Agronomy Journal* 90 (6):747-752. doi:10.2134/agronj1998.00021962009000060005x.

Rice, Charles W., and M. Scott Smith. 1984. "Short-Term Immobilization of Fertilizer Nitrogen at the Surface of No-Till and Plowed Soils." *Soil Science Society of America Journal* 48 (2): 295-297. doi:10.2136/sssaj1984.03615995004800020013x.

Rizos, Chris. 2007. "Alternatives to Current GPS-RTK Services and Some Implications for CORS Infrastructure and Operations." *GPS Solutions* 11 (3) (July) Abstract.

Ruiz Diaz, D. A., J. A. Hawkins, J. E. Sawyer, and J. P. Lundvall. 2008. "Evaluation of In-Season Nitrogen Management Strategies for Corn Productions." *Agronomy Journal* 100 (6): 1711. doi:10.2134/agronj2008.0175.

Rutto, E., J. P. Vossenkemper, J. Kelly, B. k. Chim, and W. R. Raun. 2013. "Maize Grain Yield Response to the Distance Nitrogen Is Placed Away From the Row." *Experimental Agriculture* 49 (01):3-18. doi:10.1017/S0014479712000981.

Scharf, Peter C., D. Kent Shannon, Harlan L. Palm, Kenneth A. Sudduth, Scott T. Drummond, Newell R. Kitchen, Larry J. Mueller, Victoria C. Hubbard, and Luciane F. Oliveira. 2011. "Sensor-Based Nitrogen Applications Out-Performed Producer-Chosen Rates for Corn in On-Farm Demonstrations." *Agronomy Journal* 103 (6): 1683. doi:10.2134/agronj2011.0164.

Schjonning, P., M. Lamande, T. Keller, J. Pedersen, and M. Stettler. 2012. "Rules of Thumb for Minimizing Subsoil Compaction." *Soil Use and Management* 28 (3) (September): 378-393. doi:10.1111/j.1475-2743.2012.00411.x.

Schmidt, JP, AJ DeJoia, RB Ferguson, RK Taylor, RK Young, and JL Havlin. 2002. "Corn yield response to nitrogen at multiple in-filed locations." *Agronomy Journal* 94 (4) (August): 798-806.

Smith, K., D. Watts, T. Way, H. Torbert, and S. Prior. 2012. "Impact of Tillage and Fertilizer Application Method on Gas Emissions in a Corn Cropping System." *Pedosphere* 22 (5) (October) Abstract.

Soares, Johnny Rodrigues, Heitor Cantarella, and Marcella Leite de Campos Menegale. 2012. "Ammonia Volatilization Losses from Surface-applied Urea with Urease and Nitrification Inhibitors." *Soil Biology and Biochemistry* 52 (0) (September): 82-89. doi:10.1016/j.soilbio.2012.04.019.

Sogbedji, J.M, H.M van Es, S.D Klausner, D.R Bouldin, and W.J Cox. 2001. "Spatial and Temporal Processes Affecting Nitrogen Availability at the Landscape Scale." *Soil and Tillage Research* 58 (3-4) (March): 233-244. doi: 10.1016/S0167-1987(00)00171-9.

Stecker, J. A., D. D. Buchholz, R. G. Hanson, N. C. Wollenhaupt, and K. A. McVay. 1993. "Application Placement and Timing of Nitrogen Solution for No-Till Corn." *Agronomy Journal* 85 (3): 645-650. doi:10.2134/agronj1993.00021962008500030023x.

Sun, Y., J. Lin, D. Ma, Q. Zeng, and P. Schulze Lammers. 2007. "Measurement of Penetration Force Using a Hall-current-sensor." *Soil and Tillage Research* 92 (1-2) (January): 264-268. doi:10.1016/j.still.2006.01.002.

Tasca, Francis Alex, Paulo Roberto Ernani, Douglas Antonio Rogeri, Luciano Colpo Gatiboni, and Paulo Cézar Cassol. 2011. "Volatilização De Amônia Do Solo Após a Aplicação De Ureia Convencional Ou Com Inibidor De Urease." *Revista Brasileira De Ciência Do Solo* 35 (2) (April): 493-502. doi:10.1590/S0100-06832011000200018.

Tilman, David, Kenneth G. Cassman, Pamela A. Matson, Rosamond Naylor, and Stephen Polasky. 2002. "Agricultural Sustainability and Intensive Production Practices." *Nature* 418 (6898) (Aug. 8): 671-677. doi:10.1038/nature01014.

Townsend, Alan R., and Robert W. Howarth. 2010. "Fixing the Global Nitrogen Problem." *Scientific American* 302 (2) (Feb. 1): 64-71. doi:10.1038/scientificamerican0210-64.

Vetsch, JA, and GW Randall. 2000. "Enchancing No-tillage Systems for Corn with Starter Fertilizers, Row Cleaners, and Nitrogen Placement Methods." *Agronomy Journal* 92 (2) (April): 309-315. doi:10.1007/s100870050038.

Viswakumar, A., R. W. Millen, A. Sundermeier, and C. E. Dygert. 2008. "Tillage and Nitrogen Application Methodology Impacts on Corn Grain Yield." *Journal of Plant Nutrition* 31 (11): 1963-1974. doi:10.1080/01904160802403102.

Walsh, Olga, William Raun, Art Klatt, and John Solie. 2012. "Effect of Delayed Nitrogen Fertilization on Maize (*Zea mays* L.) Grain Yields and Nitrogen Use Efficiency." *Journal of Plant Nutrition* 35 (4):538-555. doi:10.1080/01904167.2012.644373.

Watson, C. J., N. A. Akhonzada, J. T. G. Hamilton, and D. I. Matthews. 2008. "Rate and Mode of Application of the Urease Inhibitor N-(n-butyl) Thiophosphoric Triamide on Ammonia Volatilization from Surface-applied Urea." *Soil Use and Management* 24 (3): 246-253. doi:10.1111/j.1475-2743.2008.00157.x.

Weiss, Ulrich, and Peter Biber. 2011. "Plant Detection and Mapping for Agricultural Robots Using a 3D LIDAR Sensor." *Robotics and Autonomous Systems* 59 (5) (May): 265-273. doi:10.1016.j.robot.2011.02.011.

Wunder, Erik, and other. 2012. "GIS- and Sensor-based Technologies for Individual Plant Agriculture." *Landtechnik* 67 (12): 37-41.

Xue, Jinlin, and Tony E. Grift. 2011. "Agricultural Robot Turning in the Headland of Corn Fields." *Applied Mechanics and Materials* 63-64: 780-784.

Xue, Jinlin, Lei Zhang, and Tony E. Grift. 2012. "Variable Field-of-view Machine Vision Based Row Guidance of an Agricultural Robot." *Computers and Electronics in Agriculture* 84 (0) (June): 85-91. doi:10.1016/j.compag.2012.02.009.

Zhou, Xiaomin, Chandra A. Madrmootoo, Angus F. MacKenzie, and Donald L. Smith. 1998. "Distribution of 15N-labeled Urea Injected into Field-grown Corn Plants." *Journal of Plant Nutrition* 21 (1): 63-73. doi:10.1080/01904169809365383.

Sainz-Costa, N, and A Ribeiro. Mapping in Wide Row Crops: Image Sequence Stabilization and Inverse Perspective Transformation. (2011).

Watson, C. 2005. "Urease Inhibitors." In Frankfurt, Germany. IFA International Workshop on Enhanced-Efficiency Fertilizers.

(56) References Cited

OTHER PUBLICATIONS

Edan, Yael, Shufeng Han, and Naoshi Kondo. 2009. "Automation in Agriculture." In *Springer Handbook of Automation*, ed. Shimon Y. Nof, 1095-1128. Springer Berlin Heidelberg.
Fageria, N.K., and V.C. Baligar. 2005. "Enhancing Nitrogen Use Efficiency in Crop Plants." In *Advances in Agronomy*, ed. Donald L. Sparks, vol. 88:97-185. Abstract.
Fernandez, FG, Nafziger, ED, SA Ebelhar, and Hoeft, RG. "Managing Nitrogen." In *Illinois Agronomy Handbook*. Illinois Extension. Chapter 9. (2009).
Griepentrog, Hans W., Arno Ruckelshausen, Rasmus N. Jørgensen, and Ivar Lund, 2010. "Autonomous Systems for Plant Protection." In *Precision Crop Protection—the Challenge and Use of Heterogeneity*, ed. Erich-Christian Oerke, Roland Gerhards, Gunter Menz, and Richard A. Sikora, 323-334. Springer Netherlands.
Grift, Tony E. 2007. "Robotics in Crop Production." In *Encyclopedia of Agricultural, Food and Biological Engineering*.
Harrison, Roland, and J. Webb. 2001. "A Review of the Effect of N Fertilizer Type on Gaseous Emissions." In *Advances in Agronomy*, vol. 73:65-108. *Academic Press*. Abstract.
Sommer, Sven G., Jan K. Schjoerring, and O.T. Denmead. 2004. "Ammonia Emission from Mineral Fertilizers and Fertilized Crops." In *Advances in Agronomy*, vol. 82:557-622. Academic Press. Abstract.
International Search Report and Written Opinion for International Application No. PCT/US2014/066610 dated Mar. 30, 2015.
International Search Report and Written Opinion for International Application No. PCT/US2013/042479 dated Aug. 28, 2013.
IPRP for International Application No. PCT/US2013/042479 dated Dec. 11, 2014.

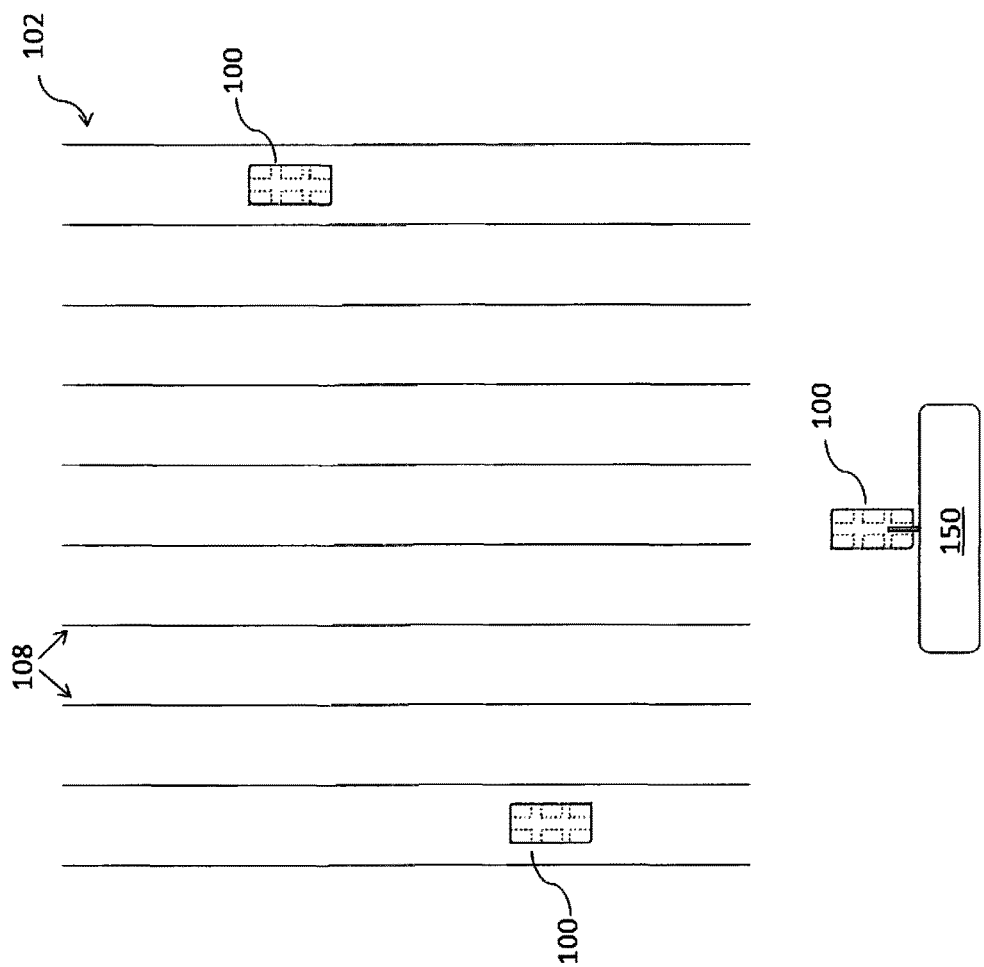

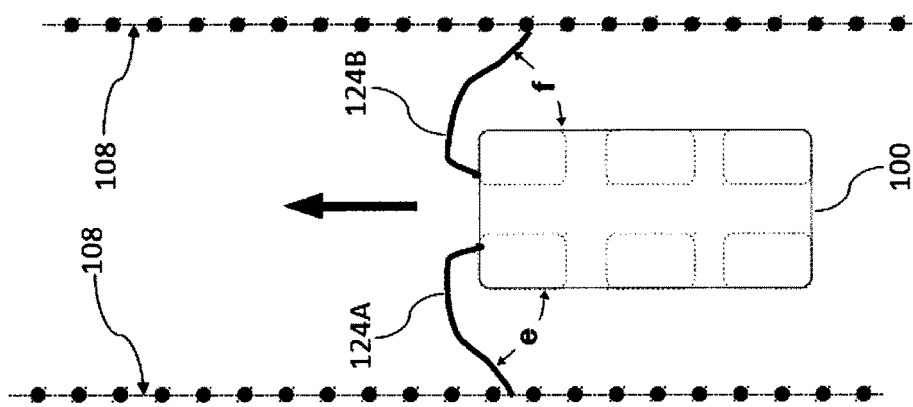

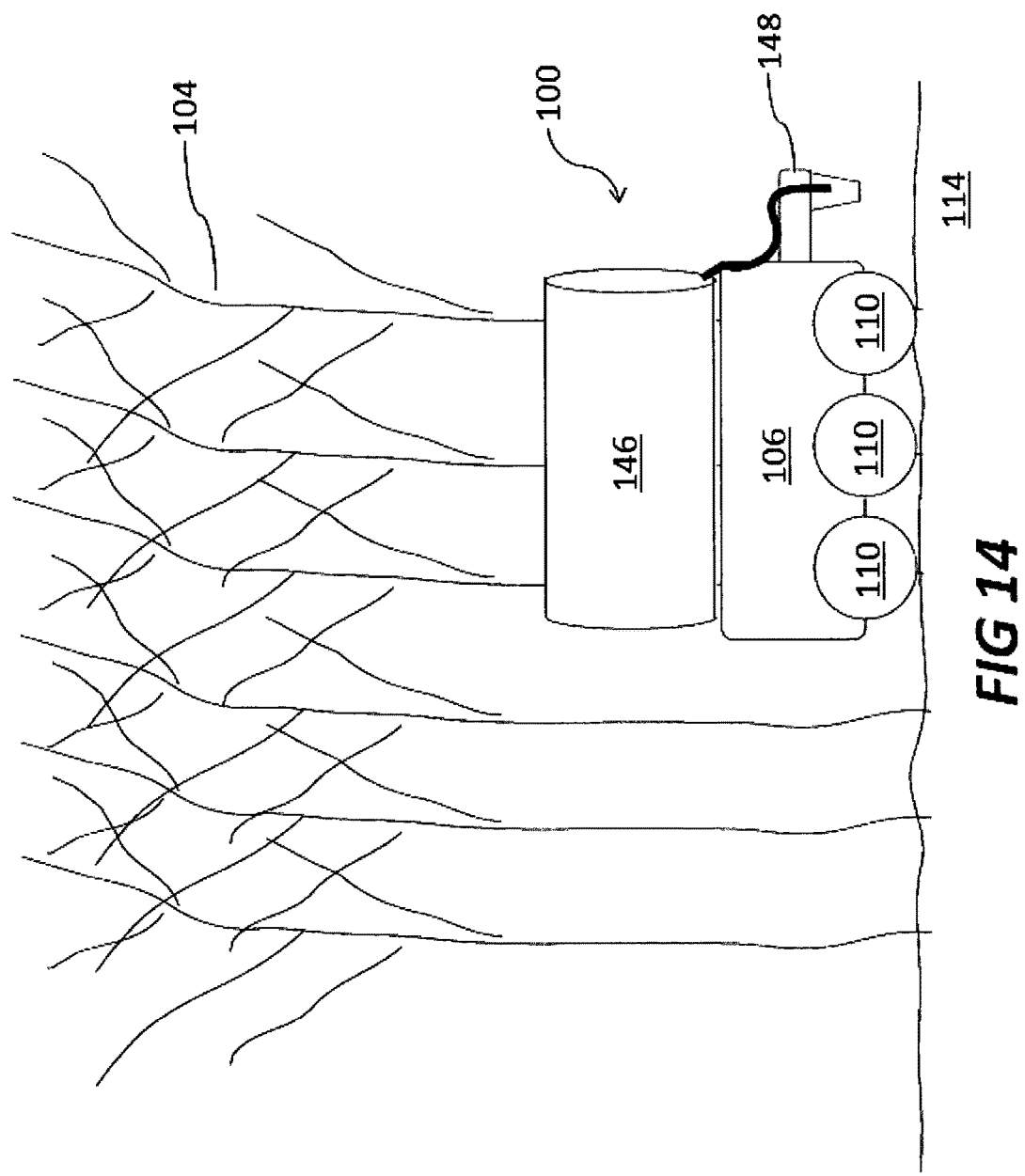

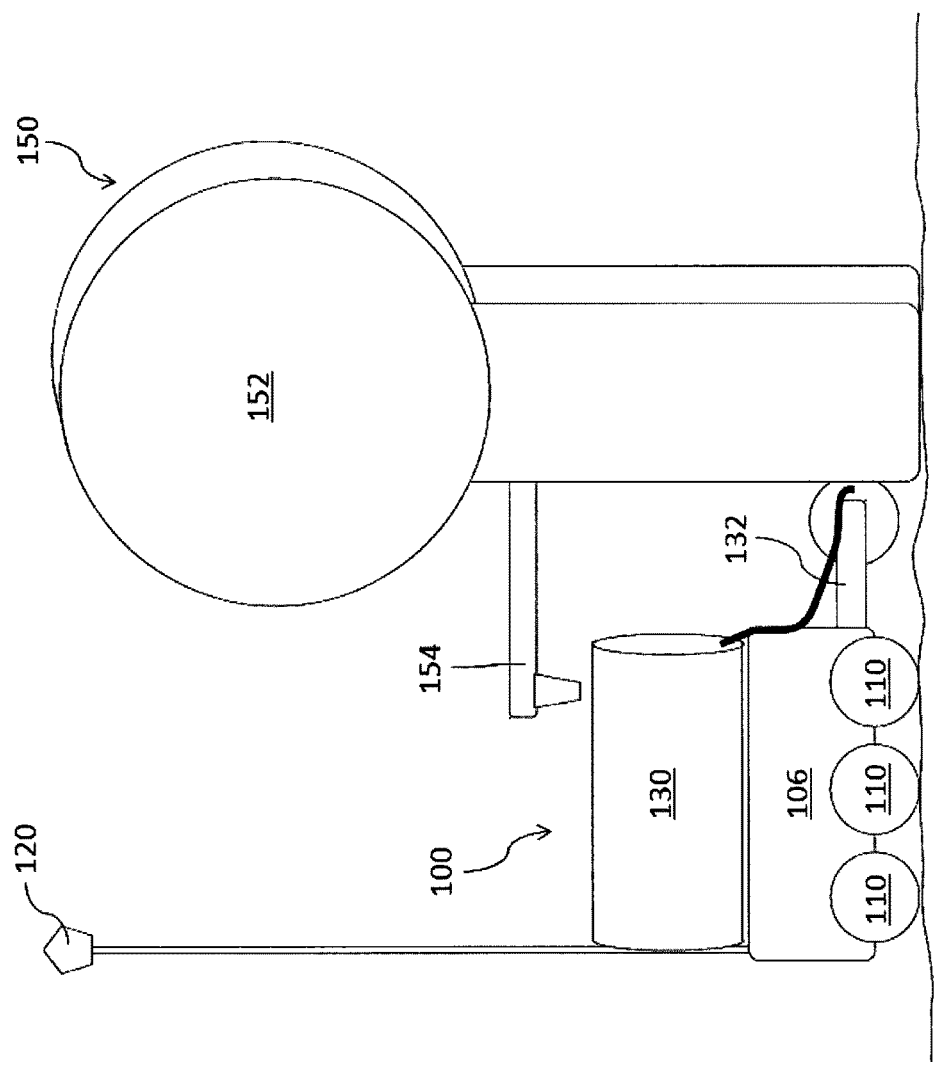

ROBOTIC PLATFORM AND METHOD FOR PERFORMING MULTIPLE FUNCTIONS IN AGRICULTURAL SYSTEMS

RELATED APPLICATIONS

This application is a continuation of application Ser. No. 13/837,786 filed Mar. 15, 2013, which claims the benefit of U.S. Provisional Application No. 61/654,444 filed Jun. 1, 2012, U.S. Provisional Application No. 61/723,887 filed Nov. 8, 2012, and U.S. Provisional Application No. 61/739,268 filed Dec. 19, 2012, entitled Robotic Platform and Method for Performing Multiple Functions in Agricultural Systems, each of which are incorporated herein by reference.

TECHNICAL FIELD

The present invention relates generally to methods and robotic platforms for use in agriculture. More particularly, the present invention relates to an autonomous vehicle platform configured to perform various in-season management tasks between the planted rows of an agricultural field, including nitrogen fertilization, and methods for accomplishing the tasks.

BACKGROUND OF THE INVENTION

After a growing plant exhausts the nutrient resources stored in its seed, it begins to drawn in nutrients from the surrounding soil using its root system. Rapidly growing plants have a high need for nutrients. If a plant cannot access the necessary nutrients then its growth becomes limited. Such nutrient limitation can impact the overall growth of the plant, the production of seeds, such as corn kernels, and the economic return to the farmer. Corn plants, in particular, require nitrogen at least until reaching the point when tassels appear, which may be at heights of 2 m (6 feet), or more. Farmers use a range of strategies for increasing the availability of nutrients for a growing crop, most notably the addition of chemical fertilizers, for example nitrogen and phosphorus.

Generally, externally-added nitrogen has the potential to be lost from farm fields more readily than does externally-added phosphorus. Nitrate, a commonly found form of nitrogen that is negatively charged, dissolves readily in water and is lost as water runs off fields into drainage ditches or streams, or as water seeps downward into groundwater. Agricultural runoff containing significant concentrations of chemical fertilizers, such as nitrogen, can lead to degraded water quality in downstream water bodies. In addition, elevated levels of nitrate in groundwater can be a human health threat.

Ammonium is a positively charged ion that generally will bind to soil particles and will, therefore, be resistant to loss via runoff. However, in alkaline conditions, ammonium transforms into its gaseous form, ammonia, which can be readily lost to the atmosphere. Furthermore, ammonium can be transformed into nitrate—and subsequently lost from the field—via a microbial process known as nitrification.

Fertilizer containing urea is susceptible to significant loss when applied to the soil surface. Specifically, the urea is hydrolyzed, or broken down, releasing ammonia gas. However, if this happens within the soil profile, there is less chance the ammonia gas will be lost to the atmosphere; with favorable soil chemistry, ammonia is converted to ammonium, a more stable form of nitrogen. Fertilizer additives are currently marketed to reduce temporarily the rate of urea hydrolysis.

Nitrogen can also be lost through a process known as denitrification, whereby nitrate is converted to gaseous forms of nitrogen, including dinitrogen—the form of nitrogen found in the atmosphere—and nitrous oxide. Nitrous oxide carries with it several serious environmental concerns; namely, it is a greenhouse gas many times more potent than carbon dioxide, it contributes to stratospheric ozone depletion, and it contributes to smog.

Nitrogen can also be lost from the soil through microbial-mediated processes that create other gaseous forms of nitrogen. Warmer soil temperatures cause microbial processes to occur more rapidly, meaning that nitrogen fertilizer remaining in or on warmer soils is increasingly susceptible to this type of loss.

Phosphorus is most commonly found in soils as phosphate. By contrast to nitrogen, phosphorus readily binds to soil particles. Nevertheless, phosphorus can be lost from fields through soil erosion or, less commonly, via runoff if the soil can no longer bind additional phosphate because all available binding sites are filled.

Fertilizer costs, which are closely tied with the cost of fossil fuels, are significant in the production of commodity crops like corn. Fertilizer that is lost from the farm field represents inefficiency in agricultural production systems, as well as a potential loss in profit realized by the farmer. Particularly in the case of nitrogen fertilizer, the longer an externally-applied fertilizer remains on an agricultural field, the more opportunities there are for the fertilizer to be lost as described above.

Pre-season applications of fertilizer is common, either in the late fall following harvest or around the time of planting in the spring. Both fall and spring applied nitrogen has the potential of being lost from the field during heavy spring rains, plus fall applied nitrogen has several additional months on the field when it can be lost due to the various processes outlined above.

As a crop becomes established, it effectively pumps water from the soil to the atmosphere through a process known as transpiration. As a crop's leaf area increases, its ability to pump water from soil to atmosphere increases. In part, because of a crop's increased ability to pump water via transpiration, there is a reduced chance that heavier rains will lead to runoff. Nevertheless, heavy rains that lead to flooding still increase the likelihood of nitrogen loss via denitrification, especially if soils are warmer.

The substantial cost of fertilizer in the production of commodity crops like corn incentivizes farmers to adjust applications to match the needs of what their crop will ultimately require throughout the growing season. Yet, farmers are prone to over-apply nitrogen out of anxiety that there will be insufficient nitrogen available when it is required by their growing crop. Furthermore, some farmers forego in season application of nitrogen because of their anxiety about being able to get the necessary equipment on the field within the appropriate time window.

Additionally, farmers contend with a range of tradeoffs when considering the timing and size of fertilizer applications. For example, fertilizer is often cheaper in the fall, although there is increased likelihood of nitrogen losses with fall application.

Farm fields are heterogeneous, with one location potentially varying year-to-year in its nutrient status and differing from locations in its immediate vicinity. It is standard for farmers to assess soil nutrient status with periodic samples analyzed in a laboratory. Soil tests are used to estimate nutrient needs prior to the growing season, in season, or prior to an in season application of nitrogen. Independent crop consultants are commonly retained by farmers to help interpret lab analyses of soil tests and management practices. Similarly, land grant universities have extension agronomists who are able to assist farmers in these types of management decisions.

The potential for heterogeneity of nutrient status across a given field has led some to develop a soil sampling system that blends together a large number of samples taken as the equipment travels across a field. This approach may, however, mask finer-scale heterogeneity that could be used to guide variable applications of fertilizer across a field.

In recent years, instruments that measure optical properties of the growing plants are being used to indicate zones of nutrient deficiency that can subsequently be addressed with the precision application of fertilizer containing the necessary nutrient. In some cases, these instruments are used at the same time a farmer is fertilizing a field, with near-instantaneous adjustments made to meter the applied fertilizer. Strategies have been developed for mapping field zones to aid in the application of fertilizer.

The use of tractor-drawn and self-propelled equipment to manage row crops is well known. In situations where taller crops require management, the use of tractor-drawn equipment is possible to a point, beyond which, high-clearance vehicles are required. In situations where high clearance is required, it is possible to use airplanes to apply agricultural chemicals and even to seed cover crops, although airplane application is not feasible or ideal in many situations.

Corn plants, in particular, require nitrogen at least until reaching the point when tassels appear, which may be at heights of six feet or more. Conventional tractor-drawn implements are incapable of applying fertilizer when corn is so tall, which has led to the use of self-propelled sprayer systems, often referred to as "high boy" systems. Such high-boy systems are capable of straddling corn that is about six feet tall.

A typical nitrogen fertilizer used in such applications is known as UAN (liquid mixture of urea and ammonium nitrate in water). Best practices include working fertilizer such as UAN into the soil between rows of corn rather than spraying it on the soil surface. Justifications include research that indicates there will be less loss of nitrogen through volatilization and absorption by decaying plant material on the soil surface which tends to bind the UAN, inhibiting the movement of UAN downward through the soil toward the crop's roots.

The leaves of growing corn plants, in particular, can develop visible color changes if contacted by concentrated nitrogen fertilizer, such as UAN. While research suggests that there is no long term impact on corn yields, such apparent crop damage is viewed negatively by many farmers. A modification that helps to alleviate this concern with high-boy sprayers is to attach tubes to the sprayer nozzles that extend to the soil surface. Nevertheless, these dangling tubes, attached to a fast-moving vehicle, can still result in concentrated nitrogen fertilizer splashing on the corn leaves.

Because of the concern that valuable fertilizer can be lost to the atmosphere through denitrification, further modifications of high-boy systems include implements that drop down from an elevated toolbar and work the liquid fertilizer into the soil surface with a disc or coulter. High-boy systems can be used to apply nitrogen in this manner when corn plants are tall, but these systems are currently limited to corn that is about six feet tall. Furthermore, except in the case of when a coulter system is used, such equipment is not designed to apply UAN directionally at base of the plants, especially for taller corn. Rather, UAN is sprayed or integrated more or less indiscriminately between rows. However, in an effort to avoid splashing UAN directly on to the corn plants themselves, there are after-market products designed to guide the liquid stream to the ground.

Cover crops, which are generally seeded between the time that cash crops are grown, can provide a number of benefits in agriculture. A field with a cover crop may have less soil erosion.

Some cover crops, which fix nitrogen from the atmosphere, can augment the amount of soil nitrogen in a field and reduce the need for applied fertilizer. As cover crops grow, they take up and store nutrients, essentially preventing them from being lost from the field in runoff or in other ways. In addition, some cover crops with deep roots can substantially reduce soil compaction.

In a crop like corn, an ideal time to seed a cover crop is when the plants are tall and their leaves are beginning to senesce (i.e., turn brown), thereby allowing sufficient light for cover crop growth to penetrate the leaf canopy. At these times, cover crops have traditionally been seeded by airplane or in some situations by customized high-clearance systems.

More recently, there has been an interest in the use of small robotic vehicles on farms. The notion of a tractor that could navigate autonomously first appeared in patent literature in the 1980s. For example, U.S. Pat. No. 4,482,960, entitled "Robotic Tractors," discloses a microcomputer based method and apparatus for automatically guiding tractors and other farm machinery for the purpose of automatic crop planting, tending and harvesting.

In 2006, one study concluded that the relatively high cost of navigation systems and the relatively small payloads possible with small autonomous vehicles would make it extremely difficult to be cost effective with more conventional agricultural methods. Accordingly, many of the autonomous vehicles that have been developed are relatively large in size. For example, the Autonomous Tractor Corporation has touted the development of the SPIRIT autonomous tractor, which is a 102 inch wide "driverless," tracked vehicle, theoretically capable of tilling, harvesting and hauling. The SPIRIT tractor, scheduled to be on the market in 2013, will use Laser Induced Plasma Spectroscopy (LIPS) to navigate on the field—a local system (not requiring satellites) that must be trained so that it can "learn" the layout of a particular field. The SPIRIT tractor will use RADAR to avoid unexpected obstacles, like humans or other animals.

Another example is the BONIROB vehicle, which is a 1.2 m (4 ft) wide four-wheeled robotic vehicle marketed by the German company Amazone. Yet another example is U.S. Pat. No. 7,765,780, entitled "Agricultural Robot System and Method," which discloses an agricultural robot system with a robotic arm for use in harvesting of agricultural crops. However, none of these robot systems or vehicles is sufficiently narrow to allow for travel between typical planted rows in an agricultural field.

Despite the difficulty in maintaining cost effectiveness, a limited number of smaller agricultural robots have also been developed. For example, the Maruyama Mfg. Co has developed a small autonomous vehicle for spraying greenhouse crops. This machine is capable of navigating between rows of crops; however it is limited to operating in the constrained situations of a greenhouse. Moreover, it is not suited for the uneven terrain typical of an agricultural field.

Another example is U.S. Pat. No. 4,612,996, entitled "Robotic Agricultural System with Tractor Supported on Tracks," discloses a tractor which traverses between planted rows on a track system. However, use of this system first requires the installation of an elaborate and potentially expensive track system within the agricultural field. Moreover, it is unclear how such a small tractor can provide coverage to a large agricultural field, much less multiple large agricultural fields, within a reasonable window of time.

Accordingly, what is needed in the industry is a device which can autonomously navigate between the planted rows and beneath the canopy of mature plants on the uneven terrain of an agricultural field to accomplish in-season management tasks, such as selectively applying fertilizer, thereby enabling the application of fertilizer throughout the life of the crop to minimize fertilizer loss in an effort to maximize the profit realized by the farmer. Moreover, what is needed by the industry is a system in which several small autonomous devices can work cooperatively together, in an efficient manner, to complete in-season management tasks within multiple large agricultural fields in a reasonable window of time, for example over the course of a day or several days to ensure that fertilizer is applied to crops at substantially the same point in their growth cycle.

SUMMARY OF THE INVENTION

The present invention provides embodiments of an autonomous vehicle platform system and method configured to perform various in-season management tasks, including selectively applying fertilizer to the soil of an agricultural field, while self-navigating between rows of planted crops and beneath the canopy of planted crops on the uneven terrain of an agricultural field. Accordingly, the present invention enables, for instance, the ideal in-season application of fertilizer to occur once a planted crop is well established and growing rapidly. Timely application of fertilizer limits fertilizer loss, since established planted crops, as compared to seedlings, can more rapidly take up water and fertilizer from the soil. The present invention can also be employed when the planted crop height is low in order to automate some functions, such as fertilizing (i.e., when outside of the in-season timeframe).

An autonomous vehicle platform system is comprised of one or more autonomous vehicle platforms. Each autonomous vehicle platform includes a base operably connected to a plurality of ground contacting wheels. Each autonomous vehicle platform has a length, width and height, wherein the width is so dimensioned as to be insertable through the space between rows of planted crops (i.e., the gap between rows), wherein the height is so dimensioned as to preclude interference with the canopy of the planted crops. Each autonomous vehicle platform is programmed with a self direction program to autonomously navigate, and to avoid other autonomous vehicle platforms, while selectively performing an in season management task, such applying fertilizer within an agricultural field.

The autonomous vehicle platform system can also have one or more refilling stations. When one or more refilling stations are present, each autonomous vehicle platform can be programmed to compare the status of autonomous vehicle platform criteria to a programmed threshold, and to navigate to the refilling station for servicing based on said comparison.

Each autonomous vehicle platform can also include a user interface configured to transmit data to a user of the autonomous vehicle platform, and be further configured to receive command data from the user of the autonomous vehicle platform for selectively overriding the self-direction program from a remote location.

A method for fertilizing between a series of planted rows within an agricultural field with one or more autonomous vehicle platforms includes delivering one or more autonomous vehicle platforms to an agricultural field, positioning a refilling station proximate the agricultural field, orienting the one or more autonomous vehicle platforms to the agricultural field and the refilling station, and activating the self-direction program of each autonomous vehicle platform. Besides each autonomous vehicle platform being programmed with a self-direction program to autonomously navigate the autonomous vehicle platform and to avoid other autonomous vehicle platforms while accomplishing crop management tasks, such as selectively applying fertilizer.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention can be more completely understood in consideration of the following detailed description of various embodiments of the invention, in connection with the accompanying drawings, in which:

FIG. 3 is a top view of an agricultural field wherein autonomous vehicle platforms are autonomously navigating between rows of planted crops with periodic return to a refilling station for servicing or resupply in accordance with an example embodiment of the invention;

FIG. 6 is a top view of an autonomous vehicle platform with mechanical feeler arms traveling between two rows of planted crops, wherein the mechanical feeler arms can detect individual crop plants within a row of planted crops in accordance with an example embodiment of the invention;

FIG. 14 is a side view of an autonomous vehicle platform with a seed reservoir and a seeding module for planting cover crops in an agricultural field in accordance with an example embodiment of the invention;

FIG. 15 is a side view of autonomous vehicle platform refilling at a refilling station in accordance with an example embodiment of the invention;

Figure 1:
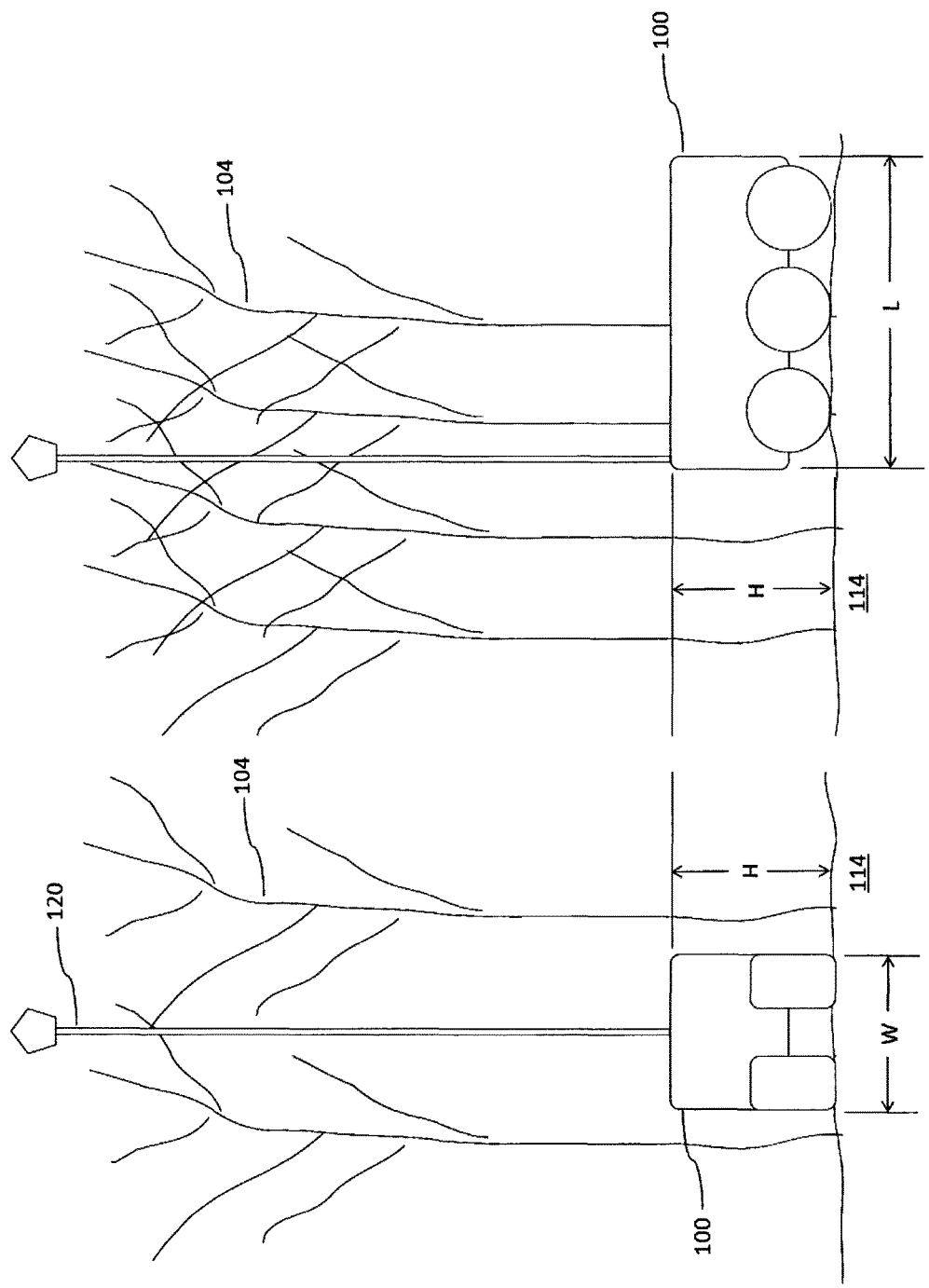
FIG. 1A is a rear view of an autonomous vehicle platform in accordance with an example embodiment of the invention.
FIG. 1B is a side view of an autonomous vehicle platform in accordance with an example embodiment of the invention.

While the invention is amenable to various modifications and alternative forms, specifics thereof have by shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Figure 2:
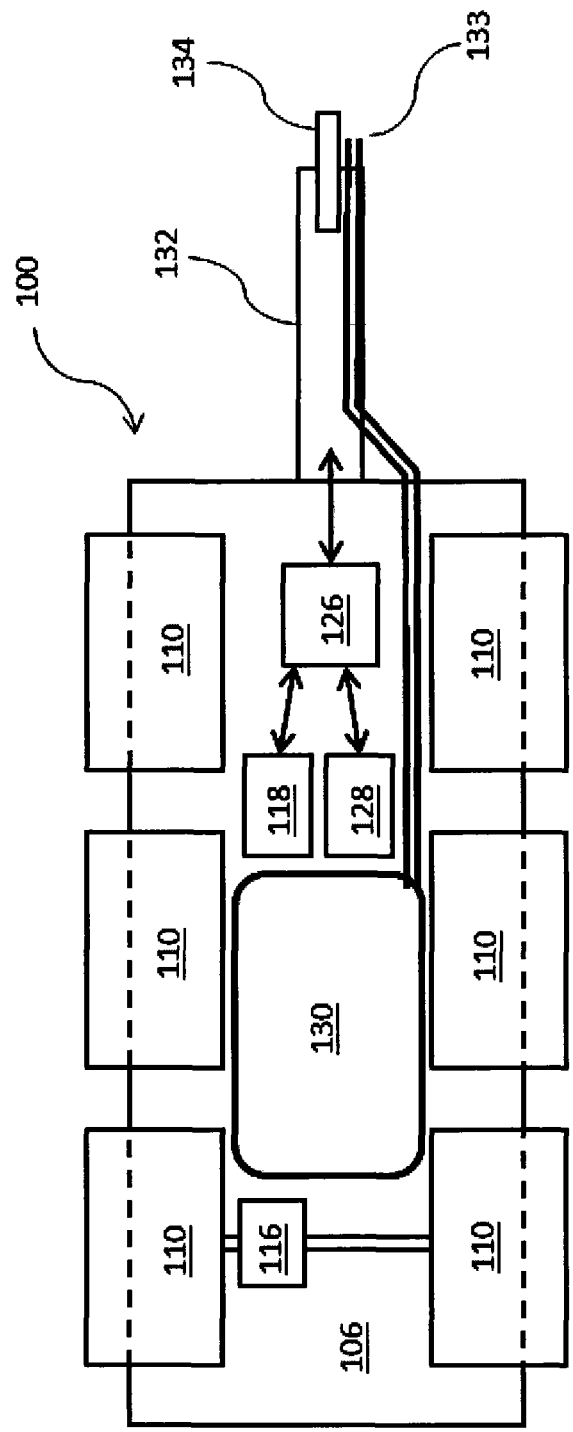
FIG. 2 is a schematic of the autonomous vehicle platform in accordance with an example embodiment of the invention.

Referring to FIGS. 1-3, an autonomous vehicle platform 100 operates in an agricultural field 102, primarily in situations where human-operated equipment cannot easily be operated. The autonomous vehicle platform 100 is, like a typical farm tractor, capable of accepting a number of implements configured to perform various in-season management tasks. However, unlike a typical farm tractor, the autonomous vehicle platform 100 is capable of autonomous navigation between rows of planted crops 104 and for taller crops, below the canopy formed by the leaves of the planted crops 104 (i.e., beneath the canopy of planted crops 104).

Figure 7:
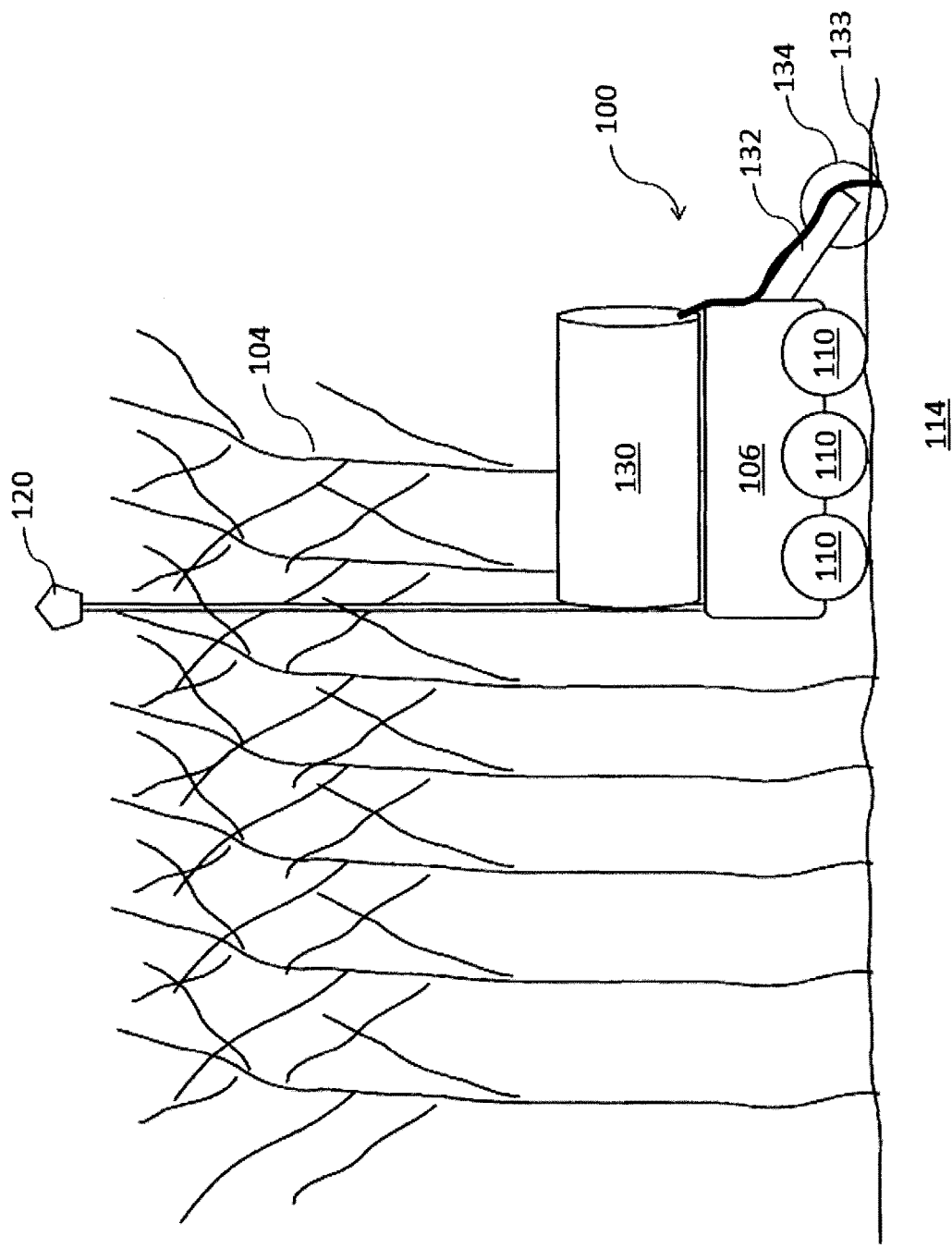
FIG. 7 is a side view of an autonomous vehicle platform with a fertilization tank and fertilization module for selective application of fertilizer within an agricultural field in accordance with an example embodiment of the invention.
Figure 13:
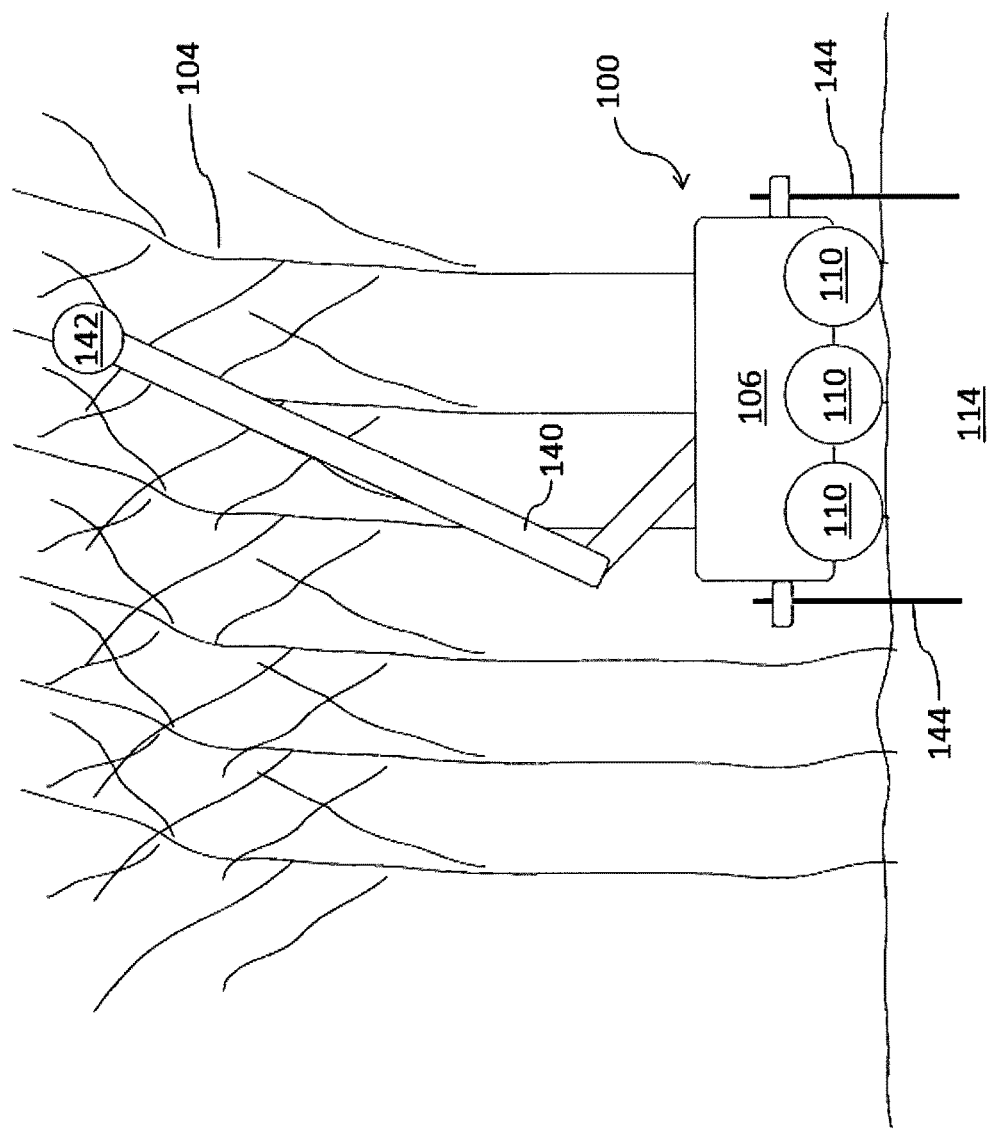
FIG. 13 is a side view of an autonomous vehicle platform with a robotic arm having a sensor and soil moisture probes for mapping plant growth zones within an agricultural field in accordance with an example embodiment of the invention.

At least three main implements of the autonomous vehicle platform 100 configured to perform various in-season management tasks include: a system for applying fertilizer (as depicted in FIG. 7), a system for mapping plant growth zones within an agricultural field 102, including the nutrient status of plants (as depicted in FIG. 13), and a system for seeding a cover crop (as depicted in FIG. 14). There are also a variety of management task applications for the autonomous vehicle platform 100. For example, a user can employ the autonomous vehicle platform 100 even when planted crop 104 height is low in order to automate some functions, such as fertilizing (i.e., when outside of the in-season timeframe).

The autonomous vehicle platform 100 has a vehicle base 106 with a length L, width W and height H. The width W of the vehicle base 106 is so dimensioned as to be insertable through the space between two rows of planted crops 108. In one embodiment, width W of vehicle base 106 can be dimensioned to be less than about 30 inches wide and can be used in conjunction with rows of planted crops 108 36 inches wide (i.e., crops 104 planted on 36 inch centers). In another embodiment, width W of vehicle base 106 can be dimensioned to be less than about 20 inches wide and can be used in conjunction with rows of planted crops 108 30 inches wide. The height H of the vehicle base 106 is so dimensioned as to preclude interference with the canopy of the planted crops 104. Thus, the autonomous vehicle platform 100 is capable of traveling between rows of tall planted crops 108, such as corn or sunflowers, without being limited by the height of the planted crops 104.

Figure 4B:
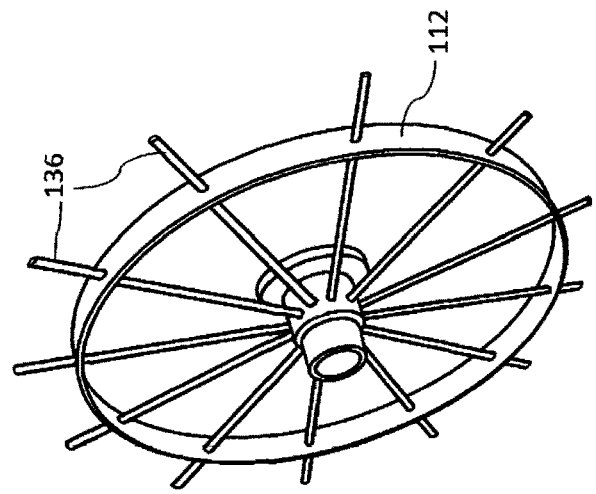
FIG. 4B is a perspective view of a spiked drum in accordance with an example embodiment of the invention.
Figure 4A:
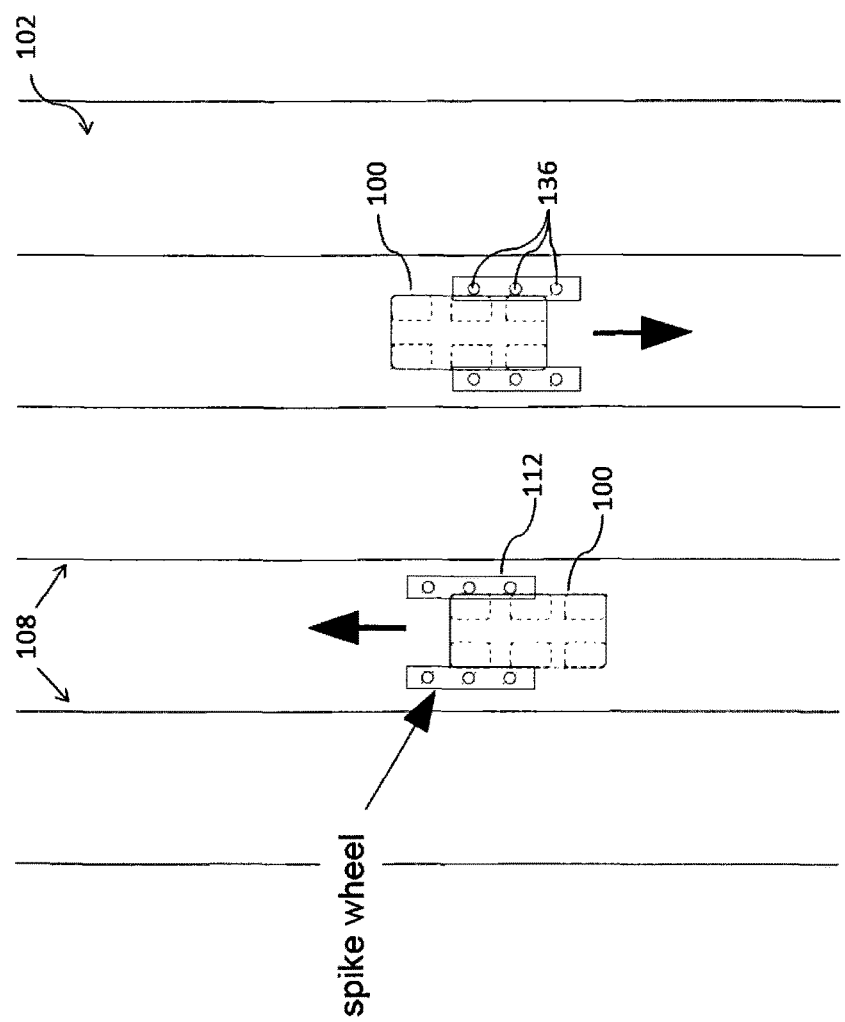
FIG. 4A is a top view of an agricultural field wherein autonomous vehicle platforms have spiked drums for making penetrations into the soil in accordance with an example embodiment of the invention.

The autonomous vehicle platform 100 has a plurality of ground contacting wheels 110, tracks, or some combination thereof to move across agricultural field 102. Given the combination of relatively uneven surfaces and potentially soft ground conditions the wheel size and ground contact should be maximized. Wheeled versions could have three or more wheels 110. A tracked version could have multiple tracks, possibly in combination with one or more wheels 110 to aid in steering. As depicted in FIGS. 4A and 4B, one embodiment can include spiked drums 112 to serve as a mechanism for making penetrations into the soil 114. The spiked drums 112 can also serve effectively as the autonomous vehicle platform wheels 110.

The autonomous vehicle platform 100 can operate effectively across a range of surface conditions created by different cultivation methods (e.g., no-till, low-till, strip-till, and conventional tillage), and on different soil 114 types with different crops 104 planted the previous year (i.e., over a range of plant residue conditions). In addition, the autonomous vehicle platform 100 can operate on soils 114 that would be too wet for conventional equipment.

The autonomous vehicle platform 100 has at least one powertrain fixedly coupled to vehicle base 106 and operably coupled to at least one of the plurality of wheels 110. In one embodiment a battery can be the main power source for powertrain 116. In another embodiment, a small internal combustion engine, fueled by diesel or gasoline, can be the main power source for powertrain 116. In yet another embodiment, a conventional engine can be paired with a battery to create a hybrid power system; in this configuration, the batteries can power an electrical powertrain 116 and the engine can charge the batteries. In one embodiment, the main power source for the powertrain 116 can operate continuously for more than 20 hours per day.

The autonomous vehicle platform 100 has a navigation module 118 configured to receive field orientation information and detect obstacles using a variety of inputs, including existing data about a particular agricultural field 102, as well as navigational data acquired in real time, such as data acquired via onboard cameras, radio communication with a base station, and global positioning system GPS units. A mast 120 can be in communication with the navigation module 118 to allow for an extended range and improved reception beneath the canopy of the planted crops 104.

Figure 5B:
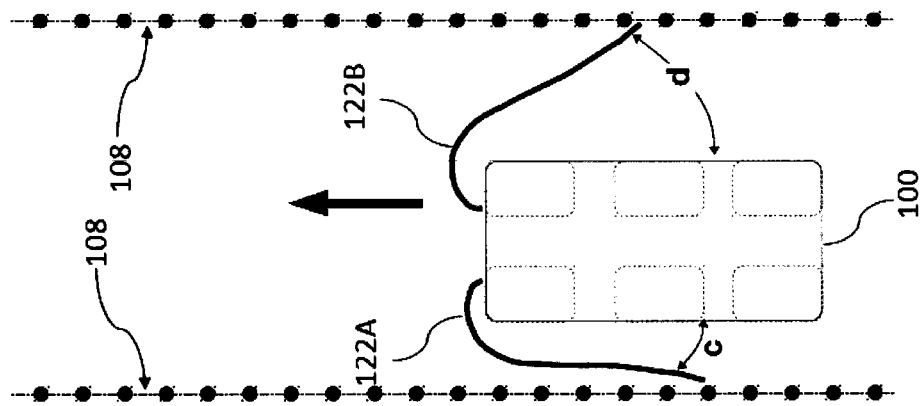
FIG. 5B is similar to FIG. 5A, but with an autonomous vehicle platform being closer to one row of planted crops than the other row of planted crops in accordance with an example embodiment of the invention.
Figure 5A:
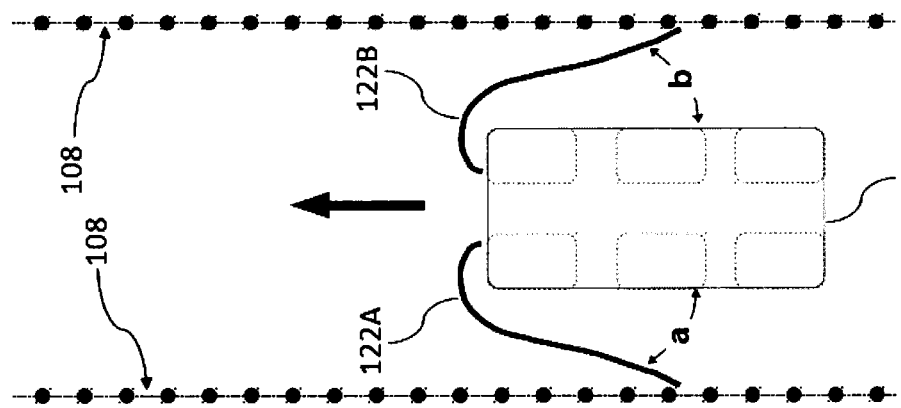
FIG. 5A is a top view of an autonomous vehicle platform with mechanical feeler arms traveling between two rows of planted crops in accordance with an example embodiment of the invention.

As shown in FIG. 5A, the autonomous vehicle platform 100 can have mechanical "feelers" 122A and 122B to gauge its location relative to rows of planted crops 108. As the autonomous vehicle platform 100 moves closer to a given row of planted crops 108, the feeler 122A on that side of the autonomous vehicle platform 100 folds inward and the feeler 122B on the other side of the autonomous vehicle platform 100 extends outward—this can be seen by contrasting FIGS. 5A and 5B, and specifically the change in angle "a" to a more acute angle "c" and angle "b" to less acute angle "d."

This mechanical feeler system requires a real-time algorithm for determining the change in feeler angles, for adjusting autonomous vehicle platform 100 steering to maintain a preferred set of feeler angles. This mechanical feeler system functions particularly well in agricultural fields 102 that have been planted using the high-accuracy RTK-GPS, because rows of the planted crops 104 are typically very straight and there would be relatively less fluctuation of feeler angles.

This mechanical feeler system also allows the autonomous vehicle platform 100 to know with a high degree of accuracy the location of individual planted crops 104 within a row of planted crops 108. As shown in FIG. 6, for planted crops 104 with rigid stalks, such as corn, the autonomous vehicle platform 100 can have shortened feelers 124A and 124B that flip in and out as they pass each plant. Such feelers 124A and 124B can be used simply to count plants or to modulate the application of fertilizer. For example, the feelers 124A and 124B can be used to identify the location of individual planted crops 104 along a row of planted crops 126 for application of fertilizer to that specific planted crop 104.

The autonomous vehicle platform 100 can have a microprocessor 126 in communication with the navigation module and other implements, programmed with a self-direction program to autonomously navigate the autonomous vehicle platform, and to avoid other autonomous vehicle platforms 100, while selectively utilizing one of three main implements, (e.g., fertilization, mapping plant growth zones, or seeding cover crop) based in part on received field orientation information and detected obstacles. For example, an agricultural field 102 can contain various rocks, debris, and other objects that might obstruct the movement of autonomous vehicle platform 100. Small animals, including pets, as well as humans young and old, can also be encountered by the autonomous vehicle platform 100. The autonomous vehicle platform 100 can have onboard capabilities to detect, avoid, navigate around, or navigate over a range of obstacles like these. Additionally, when more than one autonomous vehicle platform 100 is autonomously navigating in an agricultural field, the autonomous vehicle platform 100 can communicate with other autonomous vehicle platforms 100 in order to coordinate activities and avoid collisions.

The autonomous vehicle platform 100 can have a user interface module 128 in communication with microprocessor 126, configured to transmit microprocessor data to a user of the autonomous vehicle platform 100, and further configured to receive command data from the user of the autonomous vehicle platform for selectively overriding the self-direction program. For example, in one embodiment, a user can receive video and other sensor data remotely via wireless communications, and send control signals to selectively override autonomous vehicle platform 100 automation. Accordingly, a user can have a range of possibilities for interacting with the autonomous vehicle platform 100. The user can interact in real time via an application on a mobile device, such as a smartphone or tablet, which communicates directly, or indirectly via a server, with the autonomous vehicle platform 100. The user can interact in real time via a user interface onboard the autonomous vehicle platform 100. And, the user can also periodically interact with, and monitor, the autonomous vehicle platforms 100 via web-based or pc-based software some distance from the agricultural field 102, such as from a farm headquarters.

A. Fertilization

As shown in FIG. 7, the autonomous vehicle platform 100 can support a fertilization tank 130 and fertilization module 132 configured for selective application of fertilizer to the soil 114 of an agricultural field 102 or base of planted crops 104. The fertilization module 132 can be in communication with microprocessor 126. The fertilization module 132 can be positioned in front, underneath, or behind the wheels 110 (or tracks), or on the wheels 110 of the autonomous vehicle platform 100.

The autonomous vehicle platform 100 can utilize a liquid fertilizer known as UAN (urea-amonium-nitrate), other liquid, dry, or granular fertilizers. In one embodiment, the fertilizer tank 130 can hold less than 20 gallons of UAN. In another embodiment, the fertilizer tank 130 can hold less than 40 gallons of UAN. In another embodiment, the fertilizer tank 130 can hold less than 50 gallons of UAN. The fertilization tank 130 can be pressurized by compressed air, which could be supplied from a central compressor to aid in the delivery of fertilizer. Alternatively, the fertilizer can be pumped from the fertilization tank 130 into the fertilization module 132. Automated valves and pumps can further be used to inject the fertilizer solution into the soil 114. Baffles can be added to limit sloshing of liquid fertilizer.

Figure 8A:
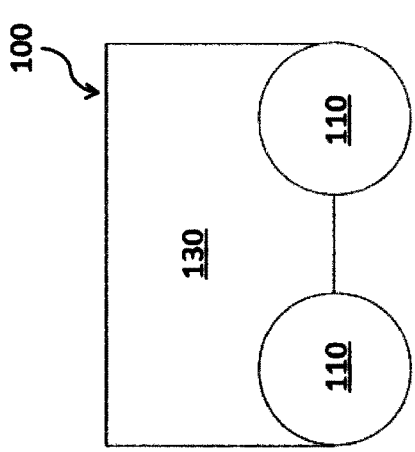
FIG. 8A is a rear view of an autonomous vehicle platform with a tank positioned above the wheels in accordance with an example embodiment of the invention.
Figure 8B:
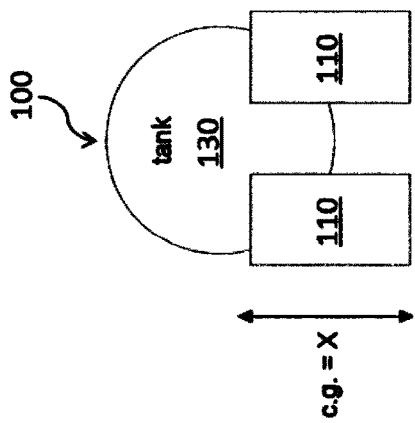
FIG. 8B is a side view of an autonomous vehicle platform with a tank positioned above the wheels in accordance with an example embodiment of the invention.

As shown in FIGS. 8A and 8B, in one embodiment, the fertilizer tank 130 can be positioned above the wheels 110. In other embodiments, the fertilizer tank 130 can be slung even with, or below the center of the wheels 110.

Figure 9A:
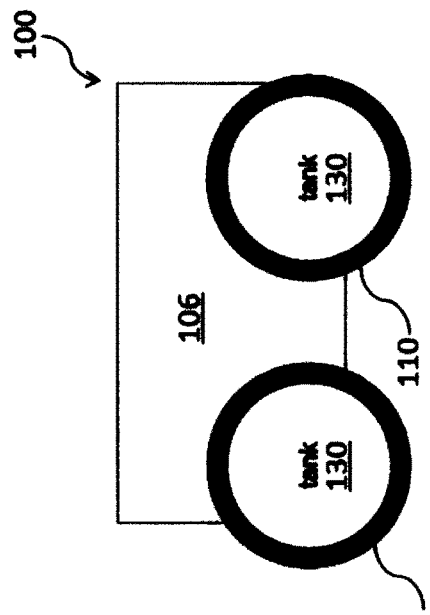
FIG. 9A is a rear view of an autonomous vehicle platform with a tank incorporated into the wheels in accordance with an example embodiment of the invention.
Figure 9B:
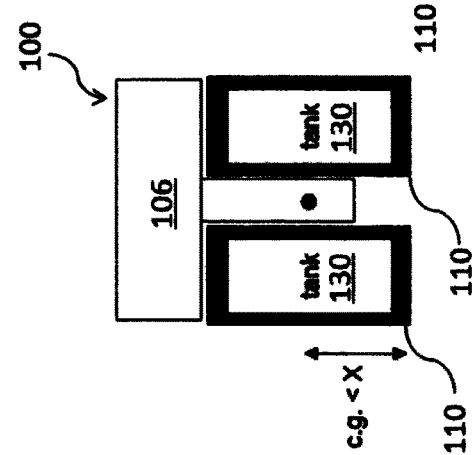
FIG. 9B is a side view of an autonomous vehicle platform with a tank incorporated into the wheels in accordance with an example embodiment of the invention.

As shown in FIGS. 9A and 9B, in another embodiment, the fertilizer tank 130 can be incorporated into the wheels 110 of the autonomous vehicle platform 100. Incorporating the tank 130 into the wheels 110 provides the lowest-possible center of gravity—even lower than a low-slung tank. With this embodiment, liquid fertilizer can be pumped, or otherwise allowed to flow, from one side of the autonomous vehicle platform 100 to the other. Thus, if it is known that the autonomous vehicle platform 100 will soon encounter a side slope, to improve stability, fluid can be transferred to the tank 111 that will be at a higher elevation.

In yet another embodiment, the fertilizer tank 130 can be a wagon pulled by the autonomous vehicle platform 100. With this embodiment the fertilization module 132 can be positioned on the autonomous vehicle platform base 104 or on the wagon. The autonomous vehicle platform 100 can also incorporate combinations of the described fertilizer tank 130 configurations.

Figure 10:
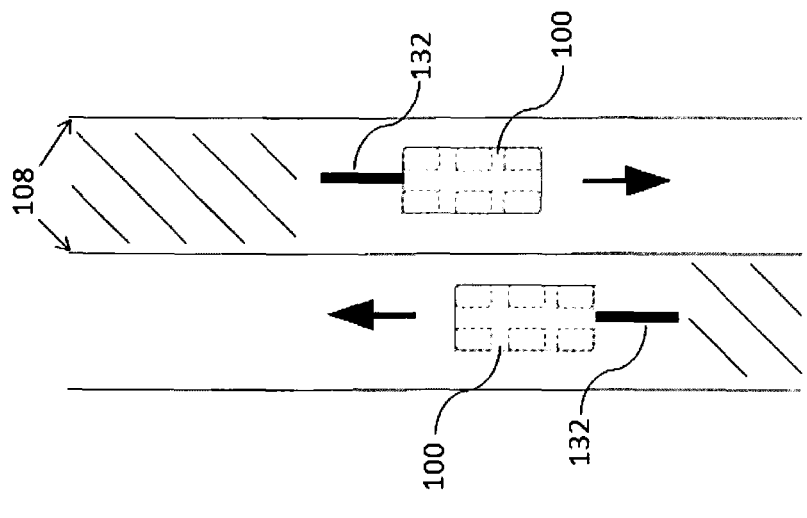
FIG. 10 is a top view of an autonomous vehicle platform applying fertilizer substantially between two rows of planted crops in accordance with an example embodiment of the invention, with the autonomous vehicle platform depicted in a first and second direction.

Depending on a range of variables, including soil type, soil moisture, and plant residue, various approaches can be used for applying fertilizer. In some embodiments, the fertilization module 132 can include a spray nozzle 133 to spray fertilizer on the soil 114 surface. As shown in FIG. 10, the fertilizer can be applied substantially between two rows of planted crops 108; in this manner the autonomous vehicle platform 100 effectively treats one half of each row of planted crop 104. For example, the autonomous vehicle platform 100 can utilize a circular disc, or coulter 134, that cut slots into the soil 114 as they are moved across the soil 114 surface. The fertilizer solution can be sprayed into this slot directly behind the coulter 134. Alternatively, a protective metal "knife" can be used directly behind the coulter 134, with a tube passing down behind the knife to introduce the fertilizer solution into the soil. Given the light weight of the autonomous vehicle platform 100, it may be necessary to add weights to the vehicle to permit sufficient downward pressure to operate the coulter 134.

As depicted in FIG. 4, multi-pronged wheels or spiked drums 112—like those that are used on agricultural cultivators to aerate soil can be incorporated. Fertilizer can be injected either through the middle of these prongs or spikes 136 while in contact with the soil 114, or subsequent to ground contact by the fertilization module 132 in the hole left after the spiked drum 134 has passed over the soil 114.

Figure 11:
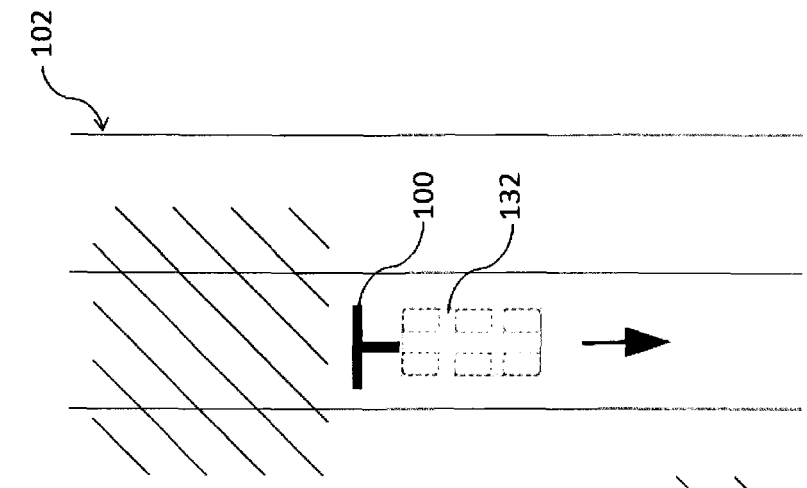
FIG. 11 is a top view of an autonomous vehicle platform applying fertilizer to the base of planted crops in accordance with an example embodiment of the invention, with the autonomous vehicle platform depicted in a first and second direction.

In yet other embodiments, the autonomous vehicle platform 100 can apply the fertilizer in a combination of locations, including one or more locations besides substantially between two rows of planted crops 104. As depicted in FIG. 11, the autonomous vehicle platform 100 can apply fertilizer proximate to the base of planted crops 104. In this manner the autonomous vehicle platform 100 effectively treats two rows of planted crop 108 on each pass, thereby doubling its coverage in comparison to fertilization substantially between two rows of planted crops 108. Note that when a UAN solution is sprayed proximate to the base of planted crops 104, a stabilizer can be added to prevent hydrolysis of the urea to ammonia gas lost to the atmosphere through volatilization. However, rain or application of irrigation water following fertilizer application can eliminate the need to treat the UAN with a stabilizer. A focused spray to specifically avoid application to crop residue can eliminate the amount of fertilizer inadvertently immobilized.

In addition to application of fertilizer as a spray proximate to the base of planted crops 104, the autonomous vehicle platform 100 can follow the fertilizer application with a spray of water, as "simulated rain." Thus, the autonomous vehicle platform 100 can have two tanks, one for fertilizer 130 and one for water. The simulated rain application helps to wash the UAN fertilizer into the soil, thereby reducing hydrolysis on the soil 114 surface.

Figure 12A:
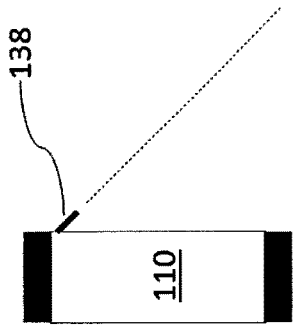
FIG. 12A is a rear view of an autonomous vehicle platform wheel with fertilization module incorporated into the wheel in accordance with an example embodiment of the invention.
Figure 12B:
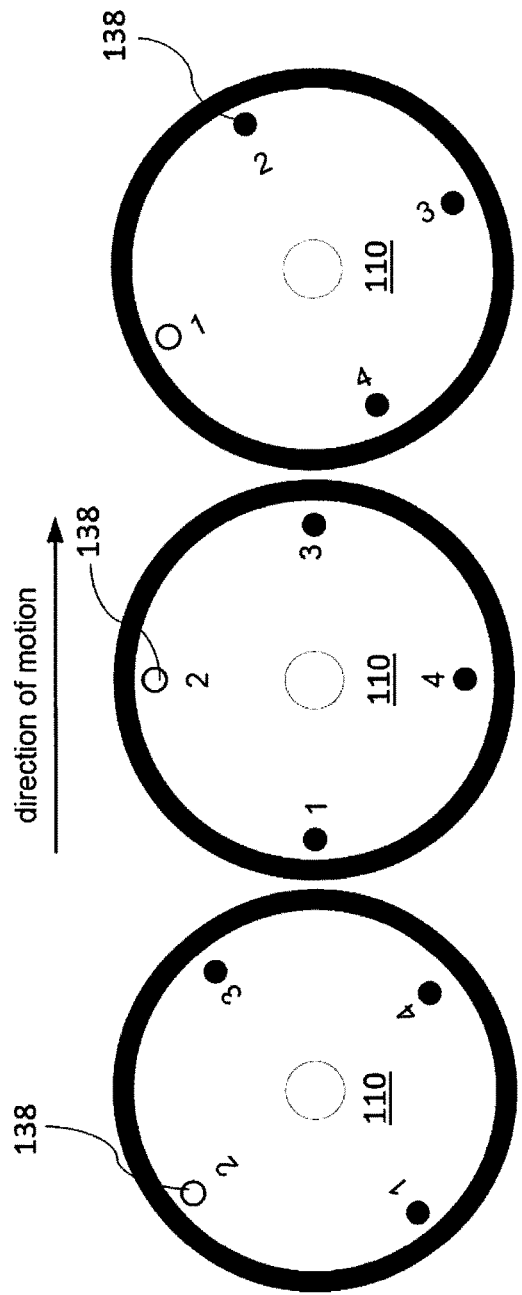
FIG. 12B is a side view of an autonomous vehicle platform wheel with a fertilization module incorporated into the wheel, with the wheel depicted in various stages of rotation in accordance with an example embodiment of the invention.

As shown in FIGS. 12A and 12B, in one embodiment, the fertilization module 112 can be a spray nozzle 138 incorporated into the sidewall of one or more wheels 110. In this embodiment, the spray nozzle 138 can be momentarily pulsed on at the top arc of the wheel 110 motion. The stream produced from the spray nozzle 138 can be focused on a single spot on the soil 114 or proximate to the base of a planted crop 104 for a specified duration of time, thereby allowing direct, concentrated application of fertilizer.

In another embodiment, the autonomous vehicle platform 100 can apply dry fertilizer pellets in a precise manner directly proximate to the base of a planted crop 104 or substantially between rows of planted crops 108, by injecting the pellets several inches into the soil in a manner that does not damage the crop's root system. In one embodiment, a rolling, spiked drum 112 is used for this purpose. In another embodiment, the autonomous vehicle platform 100 "shoots" pellets into the ground using a high-pressure air system much like what is found in air rifles that fires a BB or a pellet. Fertilizer can be applied on either side of autonomous vehicle platform 100.

The autonomous vehicle platform 100 can monitor the fertilization. For example, detailed monitoring of the flow of nutrients into the soil 114 can be provided to the user during fertilizing operations. In another example, the autonomous vehicle platform 100 can detect and rectify a situation where soil 114 becomes stuck to the coulter 134 or other parts of the equipment. The autonomous vehicle platform 100 can be equipped to monitor the depth at which it is injecting fertilizer.

In addition to fertilization, a range of herbicides, pesticides, and fungicides can be applied to planted crops 104, such as corn. In some embodiments, autonomous vehicle platform 100 can detect which plants needs a particular fungicide and then apply that fungicide using a sprayer on a mast 120 or a robotic arm 140. Such an approach would have the potential of reducing the volume of chemicals applied while still maintaining—or even increasing—crop yields.

Autonomous operation of the autonomous vehicle platform 100 can be managed and selectively overridden by one or more pc- or web-based software programs that a user can access via smartphone, tablet, interface on base station, or personal computer at the farm headquarters.

B. Mapping Plant Growth Zones

The autonomous vehicle platform 100 can have the capability to map plant condition as well as other parameters, such as soil moisture. Generally, such equipment can be in the form of an attachment connected to the vehicle base 106, integrated with the autonomous vehicle platform 100, or it could be in the form of a dedicated mapping autonomous vehicle platform 100. One goal of the mapping system is to guide the application of fertilizer. Thus, in areas where plant conditions indicate that less nutrients are required, the autonomous vehicle platform 100 will apply less fertilizer.

As shown in FIG. 13, the autonomous vehicle platform 100 can have a sensor 142 for monitoring plants, optionally mounted on a robotic arm 140. The purpose of sensor 142 is to characterize plant conditions. Sensor 142 is in communication with the microprocessor 126. Such a sensor 142 can use optical or other measurements to determine the abundance of plant pigments, such as chlorophyll, or other key parameters. Although sensor 142 can measure properties optically from below planted crops 104, it is advantageous to attach sensor 142 to robotic arm 140 to access plant material above the autonomous vehicle platform 100.

The autonomous vehicle platform 100 can have one or more soil moisture probes 144 to help map plant growth zones. Soil moisture probe 144 is in communication with the microprocessor 126. Operationally, the autonomous vehicle platform 100 can stop periodically and insert its soil moisture probe 144 into the soil 114, potentially while it is taking optical readings from several nearby planted crops 104.

The autonomous vehicle platform 100 can be programmed with an algorithm to improve efficiency in real-time plant monitoring. For example, if the autonomous vehicle platform 100 is programmed to stop periodically to take measurements, the algorithm can analyze these measurements to determine how much they vary from one another. Where adjacent measurements do not vary substantially, the algorithm can enable the autonomous vehicle platform 100 to increase the distance between monitoring locations, thereby effectively speeding up the monitoring process.

In addition to data collected via sensor 142 and soil moisture probe 144, data from crop planting operations can be used create a "base map" from which the autonomous vehicle platform 100 can navigate. Such a base map can detail the precise location of individual rows of planted crop 108, or even the location of individual plants 104. The base map can also describe the soil 114 types and field topography—including measurements made using LIDAR that describe drainage patterns on a field. A user can further interact with the map, via an interface, adding in expert knowledge. For example, the existence of different crop varieties or typically-wet areas can be added by the user.

Use of the autonomous vehicle platform 100 can also be guided by external inputs, such as weather data. For example, the user's decision on whether to fertilize at a given point in time can be influenced by inputs like weather data that ultimately predict the effectiveness of applying fertilizer within a given time window. Thus, the user can opt to delay fertilizing operations if a predicted rain storm is likely to wash a substantial portion of the added fertilizer off the field.

Like the other embodiments, autonomous operation of the autonomous vehicle platform 100 can be managed and selectively overridden by one or more pc- or web-based software programs that a user can access via smartphone, tablet, interface on base station, or personal computer at the farm headquarters.

C. Seeding Cover Crop

Another embodiment of the autonomous vehicle platform 100 can be used for seeding cover crops under tall planted crops 104, like corn. As shown in FIG. 14, the autonomous vehicle platform 100 can have a seed reservoir 146 containing seeds coupled to the vehicle base 106. The seeds can be mixed in a water solution. Seeds can be applied to the soil 114 surface via a seeding attachment 148, and can be worked into the soil using a range of common tillage methods, such as dragging a metal bar or chain. Seeding attachment 148 is coupled to microprocessor 126. Seeding cover crops can be performed while fertilizing, or during an independent (non-fertilization) pass through the agricultural field 102. Thus, the autonomous vehicle platform 100 can have a seed reservoir 146 and seeding attachment 148 in combination with fertilization and mapping equipment.

Like the other embodiments, autonomous operation of the autonomous vehicle platform 100 can be managed and selectively overridden by one or more pc- or web-based software programs that a user can access via smartphone, tablet, interface on base station, or personal computer at the farm headquarters.

D. Refilling Station

As shown in FIG. 15, each autonomous vehicle platform 100 can be programmed to periodically return to a refilling station 150. The refilling station 128 can include a refilling tank 152 and a refilling applicator 154. When used in conjunction with a refilling station 150, each autonomous vehicle platform 100 is programmed to compare the status of autonomous vehicle platform criteria to a programmed threshold, and to return to a refilling station 150 for servicing when the status of autonomous vehicle platform criteria conforms to the programmed threshold. For example, the autonomous vehicle platform 100 can be programmed with a low threshold of fuel or fertilizer. When the autonomous vehicle platform 100 senses that the actual amount of fuel or fertilizer is at or below the programmed low threshold, the autonomous vehicle platform 100 will autonomously navigate itself to refilling station 150. Several autonomous vehicle platforms 100 can operate on a given agricultural field 102, returning periodically to refilling station 150 to recharge their supply of agricultural chemicals, seeds, fuel, or other supplies.

E. Operation

In operation, a user can deliver one or more autonomous vehicle platforms 100 to an agricultural field 102, position a refilling station 128 proximate the agricultural field 102, and orient the one or more autonomous vehicle platforms 100 to the field 102 and the refilling station 128. This can entail the user placing the one or more of the autonomous vehicle platforms 100 in manual mode and driving the one or more of the autonomous vehicle platforms 100 into a docking position at refilling station 150. However, this is just one example of how to register the refilling station 150 location within each autonomous vehicle platform's 100 navigation module 118. The user then activates the self-direction program of each autonomous vehicle platform 100. Upon being switched into automatic self-direction mode, each autonomous vehicle platform 100 can be filled from the refilling applicator 132 connected to refilling tank 130 on refilling station 128. Each autonomous vehicle platform 100 can navigate to a starting point and begin navigating up and down rows of planted crops 108, fertilizing planted crop 104 along the way. In some embodiments, the autonomous vehicle platform 100 can be operated by a service provider who contracts with farmers to conduct in-season management tasks.

In some circumstances, particular areas of the agricultural field 102 can be omitted if prior monitoring has revealed that the crop will not benefit from added fertilizer in that area. In other circumstances, particular areas of the agricultural field 102 can be fertilized for the express purpose of monitoring the planted crop 104 response over subsequent days.

Oftentimes, the outer rows of planted crops 104 are planted around the full perimeter of the agricultural field 102, with subsequent rows of planted crops 108 only running either lengthwise or widthwise. The perimeter-planted corn that is at the end of the interior rows is often referred to as the "headlands." A narrow path can be cut through the headlands if the autonomous vehicle platform 100 must navigate through the end of the interior rows. Alternatively, a GPS-guided corn planter can be programmed to leave several paths through the headlands for future autonomous vehicle platform 100 access.

Given the limitations in size of the autonomous vehicle platform 100, particularly in the maximum width W and height H that will allow the autonomous vehicle platform 100 to perform the various in-season management tasks between planted rows 108 of an agricultural field 102, the fuel tank, fertilization tank 130, and seed reservoir 146 are restricted in size. Accordingly, each tank must be sized proportionately to the others to ensure that any given tank does not become the limiting factor in the autonomous vehicle platform 100 completing its operations. To accommodate various fertilization and seeding requirements, the various tanks can be modular and removable from the autonomous vehicle platform 100 to allow for the optimum tank capacity combination.

Among other logistics solutions required for optimal operation, the autonomous vehicle platform 100 can carry a pre-calculated amount of fuel and fertilizer needed to fertilize complete sets of rows from the perspective of the refilling station 150. This pre-calculated amount of fuel and fertilizer goes hand in hand with appropriately sizing the various tanks, as discussed previously. This prevents the autonomous vehicle platform 100 from having to transit more than once over the same path between rows.

Additionally, the placement of the refilling station 150 can be guided by a logistics software program. The logistics software program can account for the anticipated quantities of fuel, fertilizer, and seed to be used. These anticipated quantities can be computed using a variety of inputs, including the field layout, topography, soil condition, and anticipated weather conditions, and other conditions that may increase or decrease the amount of fuel, fertilizer, and seed to be used. The goal of the logistics software is to minimize the time a given autonomous vehicle platform 100 is traveling to and from the refilling station 150 to refill its fuel tank, fertilization tank 130, or seed reservoir 146.

In another embodiment, the refilling station 150 can have a retractable hose that can be pulled several rows into the agricultural field 102, beyond the headlands described above. In this embodiment, the refilling applicator 154 can be mounted on a stand, such as a tripod, to aid in refilling. In another embodiment, the refilling station 150 can be trailer-drawn. In this embodiment, a pump is required to refill the fertilization tank 130 of the autonomous vehicle platform 100.

Moving one or more autonomous vehicle platforms 100 and refilling stations 150 from field-to-field can be guided by one or more pc- or web-based software programs that a user can access via smartphone, tablet, interface on base station, or personal computer at the farm headquarters. Such a program can report the progress made by the autonomous vehicle platform 100 on a particular agricultural field 102, as well as overall statistics for a given time period. Accordingly, the user can prioritize her/his fields for treatment. With the user's input, the program can then determine the most efficient schedule for refilling the fuel tank, fertilization tank 130, or seeding reservoir 146, and where the refilling stations 150 should be located. Via this program, the user is prompted at the appropriate time to begin the process of refilling and/or moving a refilling station 150 such that the autonomous vehicle platforms 100 can operate as continuously as possible. The logistics software can also schedule maintenance and transport between agricultural fields 102 of the autonomous vehicle platforms 100. The goal of the logistics software is to minimize the time each given autonomous vehicle platform 100 is traveling to and from the refilling station 150, waiting in queue to be refilled, or is otherwise not performing in in-season management tasks.

What is claimed is:

1. An autonomous vehicle platform system for selectively seeding a second cover crop in an agricultural field planted with rows of a first annual crop spaced not more than thirty-six inches apart, the autonomous vehicle platform system comprising:
one or more unmanned, autonomous vehicle platforms, wherein each autonomous vehicle platform includes a base operably coupled to a plurality of ground engaging wheels or tracks, each autonomous vehicle platform having a first lateral side and a second lateral side, wherein the first and second lateral sides oppose one another and are separated by a distance defining a width of the autonomous vehicle platform, the width so dimensioned as to be receivable within a space defined between two adjacent rows of the first annual crop, wherein each autonomous vehicle platform is programmed with a self-direction program to autonomously navigate the autonomous vehicle platform within the space between two adjacent rows of the first annual crop and to avoid obstacles, including other autonomous vehicle platforms, while selectively seeding the second cover crop within the agricultural field.

2. The autonomous vehicle platform system of claim 1, wherein each autonomous vehicle platform is configured to seed the second cover crop when leaves of the first annual crop begin to senesce.

3. The autonomous vehicle platform system of claim 1, wherein each autonomous vehicle platform includes one or more seed reservoirs containing second cover crop seeds.

4. The autonomous vehicle platform system of claim 3, wherein the one or more seed reservoirs of each autonomous vehicle platform is operably coupled to the base of each autonomous vehicle platform.

5. The autonomous vehicle platform system of claim 3, wherein the second cover crop seeds are distributed by a seeding mechanism.

6. The autonomous vehicle platform system of claim 5, wherein the seeding mechanism is a seeding attachment.

7. The autonomous vehicle platform system of claim 5, wherein the second cover crop seeds are distributed between two adjacent rows of the first annual crop.

8. The autonomous vehicle platform system of claim 5, wherein the second cover crop seeds are distributed across several rows of the first annual crop.

9. The autonomous vehicle platform system of claim 5, wherein the second cover crop seeds are tilled into the agricultural field by a tillage device.

10. The autonomous vehicle platform system of claim 9, wherein the tillage device is at least one of a metal bar, a chain and a harrow.

11. The autonomous vehicle platform system of claim 1, wherein the self-direction program of each autonomous vehicle platform is configured to autonomously navigate each autonomous vehicle platform while selectively seeding the second cover crop based in part on received field orientation information and detected obstacles.

12. The autonomous vehicle platform system of claim 11, wherein the detected obstacles can be communicated to a remote user through a user interface for each autonomous vehicle platform.

13. The autonomous vehicle platform system of claim 12, wherein the self-direction program can be selectively overridden remotely through the user interface for each autonomous vehicle platform.

14. The autonomous vehicle platform system of claim 1, wherein at least one autonomous vehicle platform is configured to seed the second cover crop while applying a fertilizer to the agricultural field.

15. The autonomous vehicle platform system of claim 1, wherein at least one autonomous vehicle platform is configured to seed the second cover crop while mapping the agricultural field.

* * * * *